Nov. 14, 1961    J. R. DAVEY ET AL    3,009,014
ROUTE TRANSLATOR FOR TELEGRAPH SWITCHING
Filed Oct. 29, 1959    9 Sheets-Sheet 1

FIG. 1

INVENTORS  J. R. DAVEY
B. OSTENDORF, JR.
F. P. PACE
BY
R.C. Lipton
ATTORNEY

INVENTORS
J. R. AVEY
B. OSTENDORF, JR.
F. P. PACE

BY R C Lipton

ATTORNEY

INVENTORS J. R. DAVEY
B. OSTENDORF, JR.
F. P. PACE

ATTORNEY

INVENTORS J. R. DAVEY
B. OSTENDORF, JR.
F. P. PACE
BY
ATTORNEY

INVENTORS
J. R. DAVEY
B. OSTENDORF, JR.
F. P. PACE

BY R C Lipton

ATTORNEY

INVENTORS J. R. DAVEY
B. OSTENDORF, JR.
F. P. PACE

INVENTORS J. R. DAVEY
B. OSTENDORF, JR.
F. P. PACE

ATTORNEY

INVENTORS
J. R. DAVEY
B. OSTENDORF, JR.
F. P. PACE

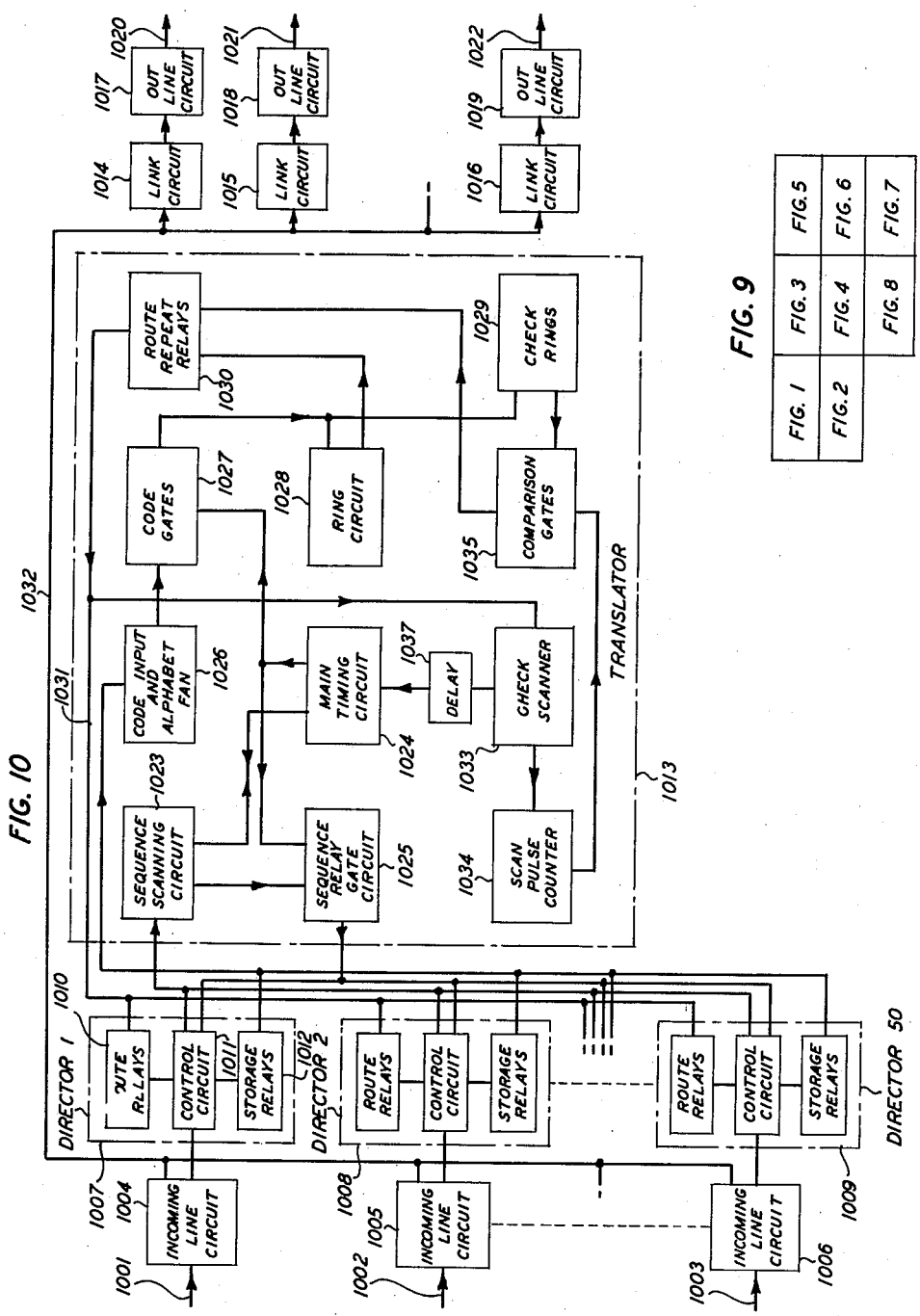

United States Patent Office 3,009,014
Patented Nov. 14, 1961

3,009,014
ROUTE TRANSLATOR FOR TELEGRAPH SWITCHING
James R. Davey, Franklin Township, Somerset County, N.J., Bernard Ostendorf, Jr., Stamford, Conn., and Frank P. Pace, Syosset, N.Y., assignors to Bell Telephone Laboratories, Incorporated, New York, N.Y., a corporation of New York
Filed Oct. 29, 1959, Ser. No. 849,648
17 Claims. (Cl. 178—2)

This invention relates to telegraph switching offices in an automatic telegraph switching system and more particularly to translating apparatus which designates the cross-office routings of telegraph messages in accordance with address codes in the messages.

A broad object of this invention is to provide an improved translator for automatic switching systems.

In previous automatic telegraph switching systems which provide switching offices for interconnecting a plurality of telegraph lines, telegraph messages received over each of the lines are stored until a connection is effected to lines extending to the addressed stations. A director circuit associated with each of the lines initiates the function of completing the cross-office connection by scanning the address codes in the message, translating the address codes to cross-office routing designations, storing the routing designations and instructing the office switching apparatus to complete the cross-office connection in accordance with the stored routing designations. In certain prior systems of this type, the function of translating was removed from the director circuit and a common translating circuit was provided for servicing a plurality of directors. Where a common translator is employed, each director bids for the service of the translator and, when the bid is accepted, seizes the translator to the exclusion of the other directors. The translator then provides the requested translation and is released by the director. A new bid by another director cannot be accepted by the translator until it is released by the prior director.

A further object of this invention is to reduce the time that each director has exclusive use of a common translator.

Another object of this invention is to provide an overlap arrangement which permits a director to seize a translator before a prior director releases the translator.

Another object of this invention is to provide an improved arrangement for checking the routing designations registered in the director by the translator.

Another object of this invention is to compare the number of routes registered in the director by the translator with a check number supplied by the translator.

An additional object of this invention is to transmit routing information from the translator to the director over a lead and the results of a successful registration of the routing information from the director to the translator over the same lead.

In accordance with a preferred embodiment of the present invention, a sequence scanner is provided to scan the directors for bids. When a bid is detected, a program circuit stops the scanner and connects the director to the input of the translator whereupon the director transfers the address code to the translator. The program circuit then connects the output of the translator to the director and the translator selectively energizes output leads in accordance with the address code to selectively operate routing relays in the director circuit, which relays lock to ground by way of the leads. While the translator is storing the routing designations in the director, the program circuit restarts the scanner whereby the director is disconnected from the input of the translator. In the event another director is bidding for the translator, the other director is connected to the input of the translator while the output of the translator is connected to the original director.

In addition to selectively operating the routing relays, the translator selectively operates one of a plurality of check circuits which indicates the count of the number of routing relays that should be operated by the translation. The check circuits are then compared with the stages of a counting circuit which counts the output leads grounded by the operated route relays. In the event that an improper number of routing relays have operated, an incorrect comparison is obtained and the translator operates a predetermined director route relay to prepare a cross-office connection to an intercept or monitoring line. After the conclusion of the count, the program circuit disconnects the output of the translator from the original director and connects the output to the other director.

The means for fulfilling the foregoing objects and the practical embodiment of the features of this invention will be fully understood from the following description taken in conjunction with the accompanying drawing wherein:

FIGS. 1–8, when arranged as shown in FIG. 9, show the details of circuits and equipment which cooperate to form a system in accordance with this invention; and FIG. 10 illustrates in block form the various equipment and circuits of the system and the manner in which they cooperate.

In several figures of the drawing, the relay contacts are shown detached from the relay windings. Contacts which are closed when the associated relay is de-energized, known as "break contacts," are represented by a single short line perpendicular to the conductor line, while contacts which are closed when the relay is energized, known as "make contacts," are represented by two short cross lines diagonally intersecting the conductor line.

General description

Referring now to FIG. 10, lines 1001, 1002 and 1003, which comprise three of fifty incoming transmission channels, are shown extending to incoming line circuits 1004, 1005 and 1006, respectively. Lines 1001, 1002 and 1003 are shown in the drawing as metallic transmission circuits. It is to be understood, however, that these lines include any of the usual types of transmission channels suitable for the transmission of telegraph or data signals.

Associated with incoming line circuits 1004, 1005 and 1006 are director circuits 1007, 1008 and 1009, respectively. Each of the other incoming line circuits that are not shown are similarly associated with a director circuit. Director 1007, which is typical of the director circuits, includes route relays 1010, control circuit 1011 and storage relays 1012. The translator circuit, which is common to all the director circuits, is indicated by block 1013.

For the purpose of describing the system, a typical operation is assumed wherein an incoming message is received over each of lines 1001 and 1002. Each message is preceded by an eight-character address code sequence which indicates the addressee station.

It is assumed that the character Q is the first character of the address code sequence received over line 1001 and that the address code sequence indicates that the message is destined for a group or plurality of addressees. It is further assumed that the character K is the first character of the address code sequence received over line 1002 and that the address code sequence indicates that the message is destined for a single addressee.

Referring now to line 1001, the incoming address code and message is stored in incoming line circuit 1004 and the address code sequence is repeated to storage relays 1012 of director 1007. When all of the address code characters are stored by storage relays 1012, control circuit 1011 makes a bid for translator 1013 by signaling main timing circuit 1024 by way of sequence scanning circuit 1023. Similarly, the address code characters of the message received over line 1002 are stored in the storage relays of director 1008 and director 1008 makes a bid to the main timing circuit 1024 by way of scanning circuit 1023.

Sequence scanning circuit 1023 scans the bid leads of the director circuits and when the lead of a bidding director is detected, main timing circuit 1024 stops sequence scanning circuit 1023. Assuming the bid from director 1007 is detected, sequence scanning circuit 1023 instructs control circuit 1011 via sequence gate circuit 1025 to extend the output of storage relays 1012 to code input and alphabet fan circuit 1026. Code input and alphabet fan circuit 1026, in turn, selects or enables a particular one of code gates 1027 in accordance with the address code sequence applied by storage relays 1012.

Assuming translator 1013 has not been servicing a previous director, the main timing circuit 1024 now instructs control circuit 1011, via sequence relay circuit 1025, to extend the translator output leads 1031 to route relays 1010. In addition, the main timing circuit 1024 applies a main timing pulse through the enabled one of code gates 1027 to ring circuit 1028 and check rings 1029. Since the first address code indicates a plurality of addressees, the pulse from the main timing circuit 1024 operates a plurality of rings in ring circuit 1028 and also operates a check ring in check rings 1029. Each ring in ring circuit 1028 is association with an addressee and each ring in check rings 1029 is indicative of the number of addressee stations designated by the address code. The energized rings of ring circuit 1028 operate associated relays of route repeat relays 1030.

Returning now to the main timing circuit 1024, after the application of the signaling pulse by way of code gates 1027, the main timing circuit 1024 instructs sequence scanning circuit 1023 to again start scanning for director bids whereupon the connection from storage relays 1012 to the input and fan circuit 1026 is disconnected. When the bid from director 1008 is detected, the main timing circuit 1024 stops sequence scanning circuit 1023 and the storage relays of director 1008 are connected to the input and fan circuit 1026, in the same manner as previously described, whereby another code gate of code gates 1027 is enabled.

Returning now to route repeat relays 1030, the operated ones of the relays operate the associated ones of route relays 1010 in director 1007 by way of multiple lead 1031. Route relays 1010 operate apparatus, not shown, which connect incoming line circuit 1004 to selected ones of outgoing line circuits 1017 through 1019 by way of cross-office multiple 1032 and link circuits 1014 through 1016 whereby the message may be retransmitted over the selected ones of line circuits 1020 through 1022 in accordance with the addressees indicated by the address code. Typical apparatus for connecting an incoming line circuit with one or more outgoing line circuits in accordance with the operation of route relays is shown in Patent 2,766,318 granted to W. M. Bacon et al. on October 9, 1956, and more particularly shown in FIGS. 111 and 112 of the Bacon et al. patent. The disclosure of this patent is hereby incorporated herein by reference as though fully set forth herein.

In addition to preparing the above-described cross-office paths, the operated ones of route relays 1010 provide indications back over lead 1031 that they have been operated. These indications are supplied to check scanner 1033 which proceeds to scan leads 1031 and advance scan pulse counter 1034 each time an operated one of route relay 1010 is detected. At the conclusion of the scan, the count of scan pulse counter 1034 is compared with the energized one of check rings 1029 by comparison gates 1035. In the event that the count does not compare with the energized one of check rings 1029, comparison gate 1035 operates a predetermined one of route repeat relays 1030 which in turn instructs route relays 1010 to connect incoming line circuit 1004 to a monitoring or intercept position. This connection is accomplished in substantially the same manner as the connections to the outgoing line circuits.

Returning now to check scanner 1033 after leads 1031 are scanned, a pulse is applied by way of delay circuit 1037 to the main timing circuit 1024, the delay of delay circuit 1037 being sufficient to permit the operation of the intercept route relay before the main timing circuit 1024 responds to the pulse from check scanner 1033.

Upon the receipt of the pulse from the check scanner 1033 the main timing circuit 1024 instructs control circuit 1011 via sequence relay gate circuit 1025 to disconnect route relays 1010 from the translator output lead 1031. In addition, main timing circuit 1024 pulses code gates 1027 and connects the route relays of director 1008 to lead 1031. Since a code gate of code gates 1027 has previously been enabled by the application of the output of the storage relays of director 1008 to input and fan circuit 1026, the application of the main timing pulse to the code gates connects incoming line circuit 1005 to the appropriate outgoing line circuit in the same manner as previously described for incoming line circuit 1004.

*Detailed description*

Figure 2:
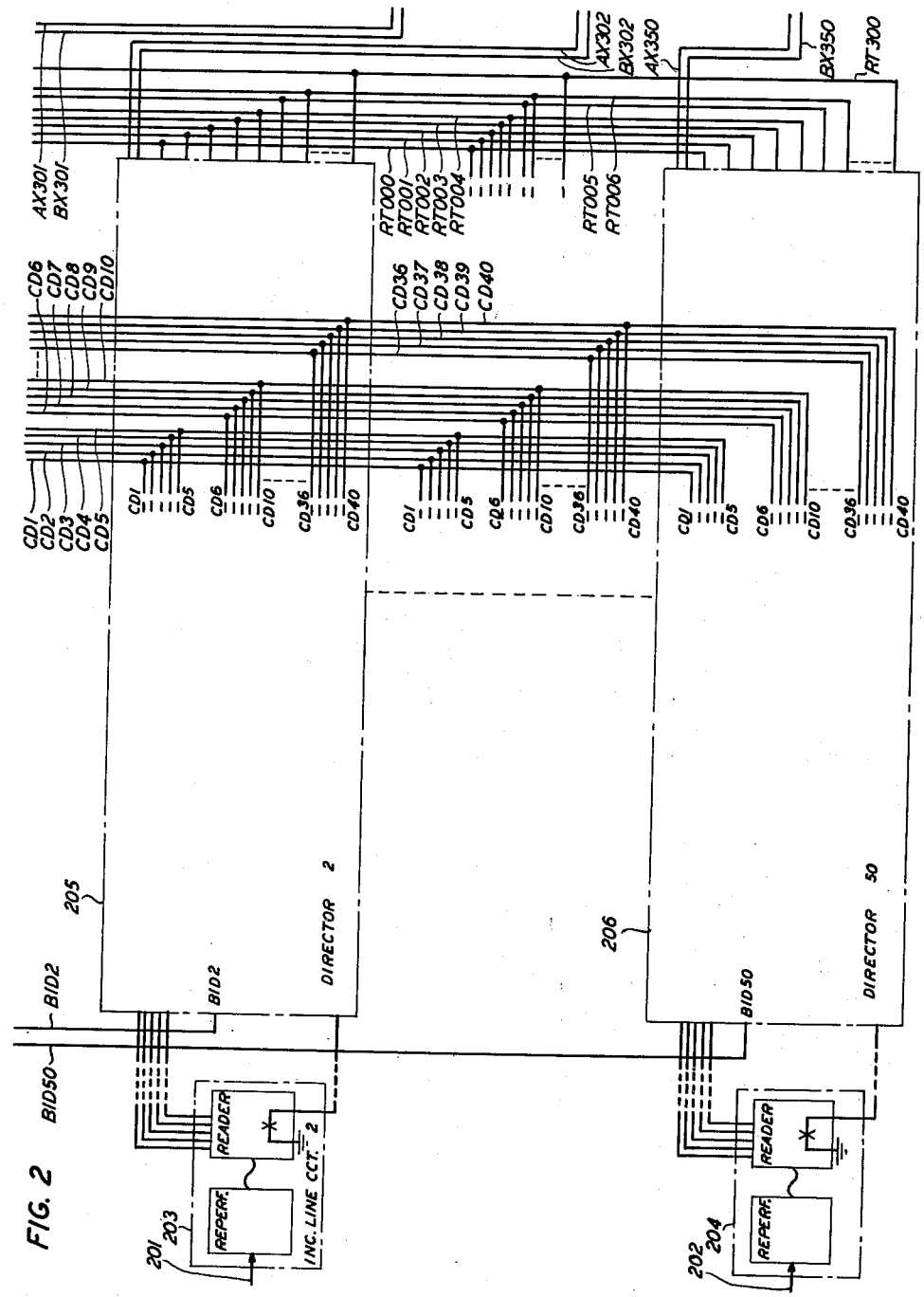

Referring now to FIGS. 1 through 8 showing the detail of the system and more particularly to FIGS. 1 and 2, incoming lines 101, FIG. 1, and 201 and 202, FIG. 2, are shown. Associated with lines 101, 201 and 202 are incoming lines circuits 102, 203 and 204, respectively. Incoming line circuits 102, 203 and 204 are associated with director circuits 107, 205 and 206, respectively.

The incoming line circuits and director circuits perform various control functions such as storing and repeating incoming messages, recognizing address and supervisory codes, testing for idle cross-office connections and controlling switching apparatus to complete the cross-office connections. Since the manner in which these functions are performed are well known in the art, only the details of the circuits and apparatus which are pertinent to an understanding of the invention are shown in FIGS. 1 and 2.

*Directors bid for translator*

Referring now to incoming line circuit 102 and director circuit 107 which are typical of the incoming line circuits and director circuits, it has been assumed that an incoming message is received over line 101 preceded by an eight-character address code. It has further been assumed that the first character of the address code is the character Q and the address code indicates a plurality of addressee stations.

The incoming address code and message is supplied to reperforator 103 which punches tape 104 in accordance with the received code characters and tape 104, in turn, is supplied to tape transmitter or reader 105. Typical apparatus for reperforating and reading tape is disclosed in Patent 2,255,794 granted to R. A. Lake on September 16, 1941, and Patent 2,348,214 granted to E. A. Gubisch on May 9, 1944. The disclosures of these patents are hereby incorporated herein by reference as though fully set forth herein.

As each character is read by reader 105, auxiliary contact 118 closes, completing a pulsing ground by way of lead 108 to counter 106. Counter 106 is a conventional eight-stage counter and may be similar to the counter subsequently described in FIG. 3. Each ground pulse on lead 108 operates a successive stage of counter 106 starting with the first stage.

The operation of the first stage of counter 106 prepares an energizing path for relay 1–CC1, operating the relay. Relay 1–CC1 operated, extends output leads 111 through 115 of reader 105 to the windings of relays 1–CD1 through 1–CD5, respectively.

Since it is assumed that the first character of the address code is Q and the permutations of the elements of the character Q are mark-mark-mark-space-mark, leads 111 through 113 and lead 115 are energized thereby operating relays 1–CD1 through 1–CD3 and 1–CD5 and these relays lock by way of their own make contacts. It is thus seen that selected ones of relays 1–CD1 through 1–CD5 are operated and locked in accordance with the first character of the address code. Relays 1–CD1 through 1–CD3 and 1–CD5 operated extend paths from ground through their own make contacts to the make contacts of relays 1–DAX, which are aligned below relay 1–DAX as shown in FIG. 1. Accordingly, when relay 1–DAX operates as described hereinafter, ground will be applied to leads CD1 through CD3 and CD5 which extend by way of multiple lead CD to similarly identified leads in the code input circuit of the translator shown in FIG. 5.

The second address character, when read by reader 105, again momentarily closes contacts 118, stepping counter 106 to stage 2 thereby releasing relay 1–CC1 and operating relay 1–CC2 in the same manner as previously described for the operation of relay 1–CC1. Relay 1–CC2 operated, extends leads 111 through 115 to relays 1–CD6 through 1–CD10 generally indicated by block 121. Accordingly, selected ones of relays 1–CD6 through 1–CD10 will be operated in accordance with the second character of the address code sequence. Similarly, ground will be applied to selected ones of leads CD6 through CD10 when relay 1–DAX operates.

In the same manner each address character read by reader 105 steps counter 106 to the next successive stage whereby subsequent groups of five of leads CD11 through CD40 are grounded, when relay 1–DAX operates, in accordance with the remaining six characters in the address code.

When counter 106 is advanced to stage 8 by the eighth character in the address code, in addition to the operation of relay 1–CC8, stage 8 operates relay 1–BID. Relay 1–BID operated, applies negative battery to lead BID1. Leads BID1 through BID50 extend by way of multiple lead BID to similarly identified leads in the sequence scanning circuit shown in FIG. 3. The application of the negative battery to lead BID1 provides a bid by director 107 to the translator circuit.

Referring now to incoming line circuit 203, the address characters received over line 201 selectively ground leads CD1 through CD40 when the DAX relay of director 205 is operated in substantially the same manner as previously described for director 107. Similarly, when the eighth address character is read, negative battery is applied to lead BID2 indicating a bid by director 205 for the translator circuit. Since it has been assumed that the first address character is the character K whose permutated elements are mark-mark-mark-mark-space, relays CD1 through CD4 of director 205 are operated preparing the ground for leads CD1 through CD4.

Director 107 also includes route relays 1–RT000 through 1–RT300 whose operation is described hereinafter. The route relays 1–RT001 through 1–RT300 prepare apparatus, not shown, which complete selected cross-office paths to the outgoing line circuits. Route relay 1–RT000 comprises the intercept route relay which prepares the intercepting or monitoring of the message from incoming line circuit 102. As previously explained, a suitable method of preparing cross-office connections in accordance with the operation of route relays are described in the above-mentioned Bacon et al. patent.

It is noted that the windings of relays 1–RT000 through 1–RT300 extend to the make contacts of relay 1–DBX which is aligned below relay 1–DBX as shown in FIG. 1 whereby, when relay 1–DBX is operated as described hereinafter, the windings of the relays are extended to leads RT000 through RT300, which leads extend by way of multiple lead RT to similarly identified leads in FIG. 7.

*Translator scans for bids*

Figure 3:
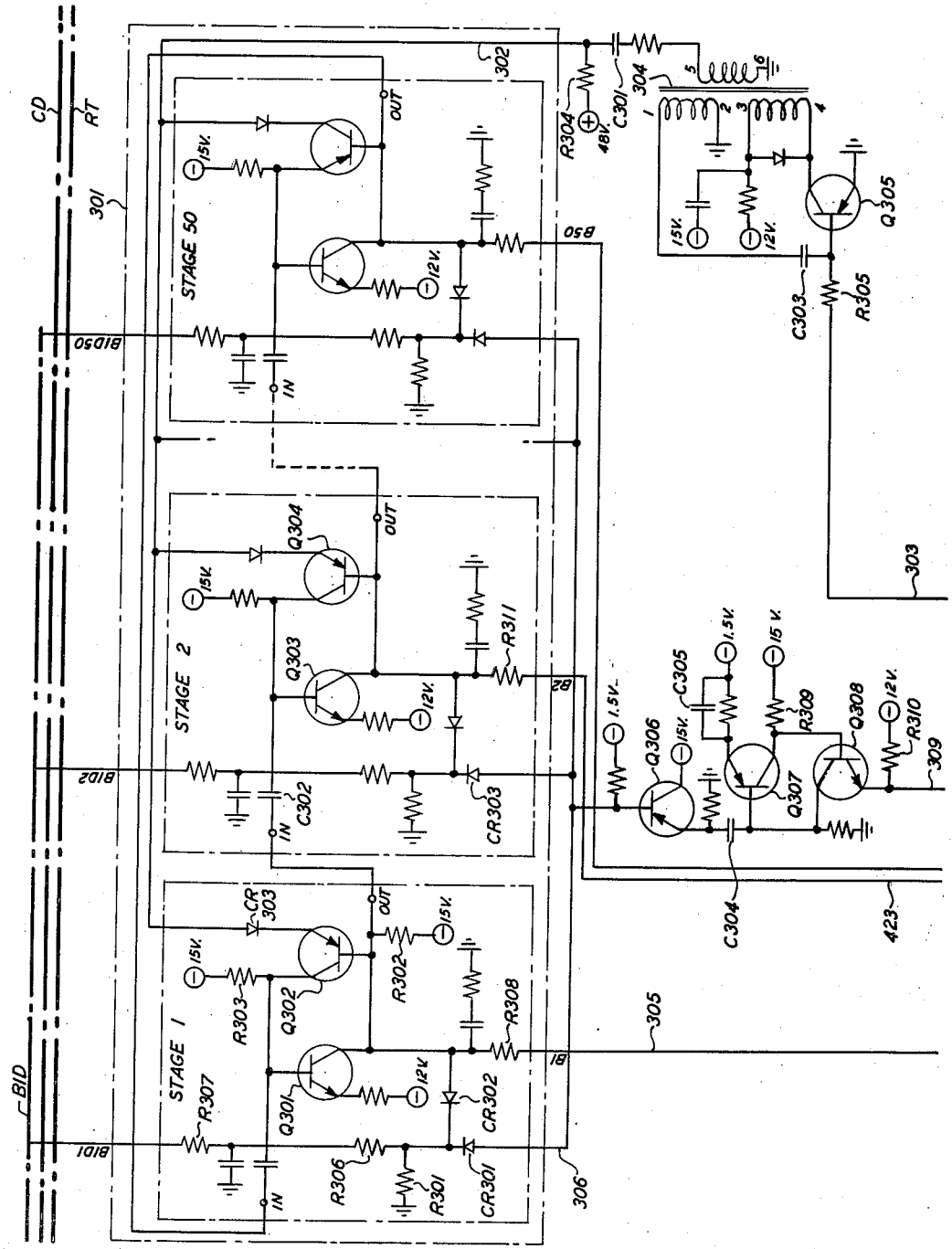

Referring now to FIG. 3, the previously-described leads BID1 through BID50, which originate in the respective director circuits, are shown extending from common lead BID to the sequence scanner circuit generally indicated by block 301.

Leads BID1, BID2 and BID50 extend to stage 1, stage 2 and stage 50, respectively, of the sequence scanner circuit 301. Similarly, the bid leads of the other director circuits extend to associated stages of scanner 301.

Stage 1 of scanner circuit 301, which is substantially similar to the other stages, includes a gating arrangement comprising varistor CR301, varistor CR302 and resistor R301. Stage 1 also includes transistor Q301 and transistor Q302 which are arranged in a "hook" connection and constitute the first stage of a 50-stage counter similar to the counter disclosed in copending application of F. P. Pace, Serial No. 727,305, filed April 9, 1958.

As disclosed in detail in the Pace application, a common source of current is applied to each stage of the counter. As shown in FIG. 3, this source is obtained from positive voltage applied to each of the stages by way of common resistor R304 and lead 302 and then to the emitter of transistor Q302, for example, by way of varistor CR303. Negative voltage driving pulses for the counter are provided to lead 302 by way of capacitor C301. Resistor R302 connected between the base of transistor Q302 and negative battery is provided to lower the base voltage of transistor Q302 sufficiently, whereby stage 1 of the counter is turned on when the operation of the counter is initiated.

Assuming now that the positive voltage on lead 302 turns on transistor Q302, the collector current to negative battery by way of resistor R303, raises the base voltage of transistor Q301 sufficiently to turn on the transistor. Transistor Q301 now draws collector current thereby lowering the base voltage of transistor Q302 whereby the "hook" connection is maintained in its operated state.

The first negative pulse applied via capacitor C301 removes the positive potential applied to the emitter of transistor Q302, thereby turning the transistor off. This lowers the collector voltage of transistor Q302, turning off transistor Q301. The collector voltage of transistor Q301 rises and a positive-going voltage is applied by capacitor C302 to the base of transistor Q303 of stage 2. Transistor Q303 turns on, lowering its collector voltage and thereby lowering the base voltage of transistor Q304 whereby transistor Q304 turns on when the negative driving pulse terminates. When transistor Q304 conducts, the potential of its collector is driven in a positive direction raising the base voltage of transistor Q303 whereby the "hook" connection of stage 2 is maintained on. Similarly, the negative driving pulses applied by way of capacitor C301 successively turn off each stage, thereby turning on the next succeeding stage.

Driving pulses for the counter are provided by a transistor blocking oscillator which includes transistor Q305. As described hereinafter, lead 303 is normally slightly negative relative to ground whereby negative current is applied to the base of transistor Q305 via resistor R305 causing transistor Q305 to conduct slightly. The resulting current gain in the collector of transistor Q305 causes the voltage at terminal 4 of the transformer 304 to go in a positive direction causing, in turn, terminal 1 of the transformer 304 to go in a negative direction. Since the terminal 1 voltage is fed back to the base of transistor Q305 via capacitor C303, the negative transition on terminal 1 of the transformer 304 reinforces the original slight negative current on the base of transistor Q305.

This positive feed-back action causes the oscillator circuit to saturate heavily.

In the saturated condition the collector and emitter of transistor Q305 are shorted and thus cause a positive rise of potential on terminal 4 of transformer 304 and causing, in turn, a negative transition on terminal 5 of transformer 304. This negative transition is the output pulse of the oscillator which is applied to lead 302 by way of capacitor C301.

For a number of microseconds this saturated condition is maintained while negatively-charged capacitor C303 discharges by way of the base of transistor Q305. When the initial charge of capacitor C303 is gone, the base voltage of transistor Q305 rises and the transistor can no longer remain saturated whereby terminal 4 voltage will begin to go in a negative direction. This negative transition results in a small positive voltage transition on terminal 1 which further raises the base voltage and the transistor Q305 then triggers to the off condition leaving the base with a substantial positive voltage from the lower plate of capacitor C303. This positive voltage marks the end of the output pulse on lead 302. The positive voltage on plate of capacitor C303 applied to the base of transistor Q305 dissipates slowly through resistor R303 and a new pulse will be formed when the positive charge on capacitor C303 is gone.

It has previously been assumed that directors 1 and 2 have made bids for the translator by applying negative potentials to leads BID1 and BID2. The negative potential applied to lead BID1 is applied across resistors R307, R306 and R301 to ground tending to lower the potential at the junction of resistors R306 and R301. This junction is maintained substantially at ground, however, by varistor CR302 which is connected to ground by way of low impedance resistor R308, lead 305 and the winding of relay 4–AX1, FIG. 4, to ground.

Assuming now that the first stage "hook" connection comprising transistors Q301 and Q302 turn on, lowering the collector voltage of transistor Q301, it is noted that this negative-going voltage is applied to varistor CR302 removing the ground applied to the junction of resistors R306 and R301 by way of varistor CR302. Thus a negative voltage appears at the junction of resistors R306 and R301 when a bid is made by the first director and the first stage of the counter is turned on. This negative voltage is applied to the base of transistor Q306 by way of varistor CR301 and lead 306. This turns on transistor Q306, lowering its emitter voltage and thus applying a negative pulse by way of capacitor C304 to the base of transistor Q307.

Transistors Q307 and Q308 comprise a monostable "hook" connection. The negative pulse at the base of transistor Q307 turns the transistor on and the emitter-to-collector current via capacitor C305 raises the collector potential which is applied to the base of transistor Q308 turning on transistor Q308. However, with transistor Q307 conducting, the emitter current discharges capacitor C305 thereby lowering the emitter voltage of transistor Q307. When capacitor C305 has sufficiently discharged to lower the voltage on the emitter of transistor Q307 below the base voltage, transistor Q307 turns off, lowering the base voltage of transistor Q308 which also turns off.

Figure 4:
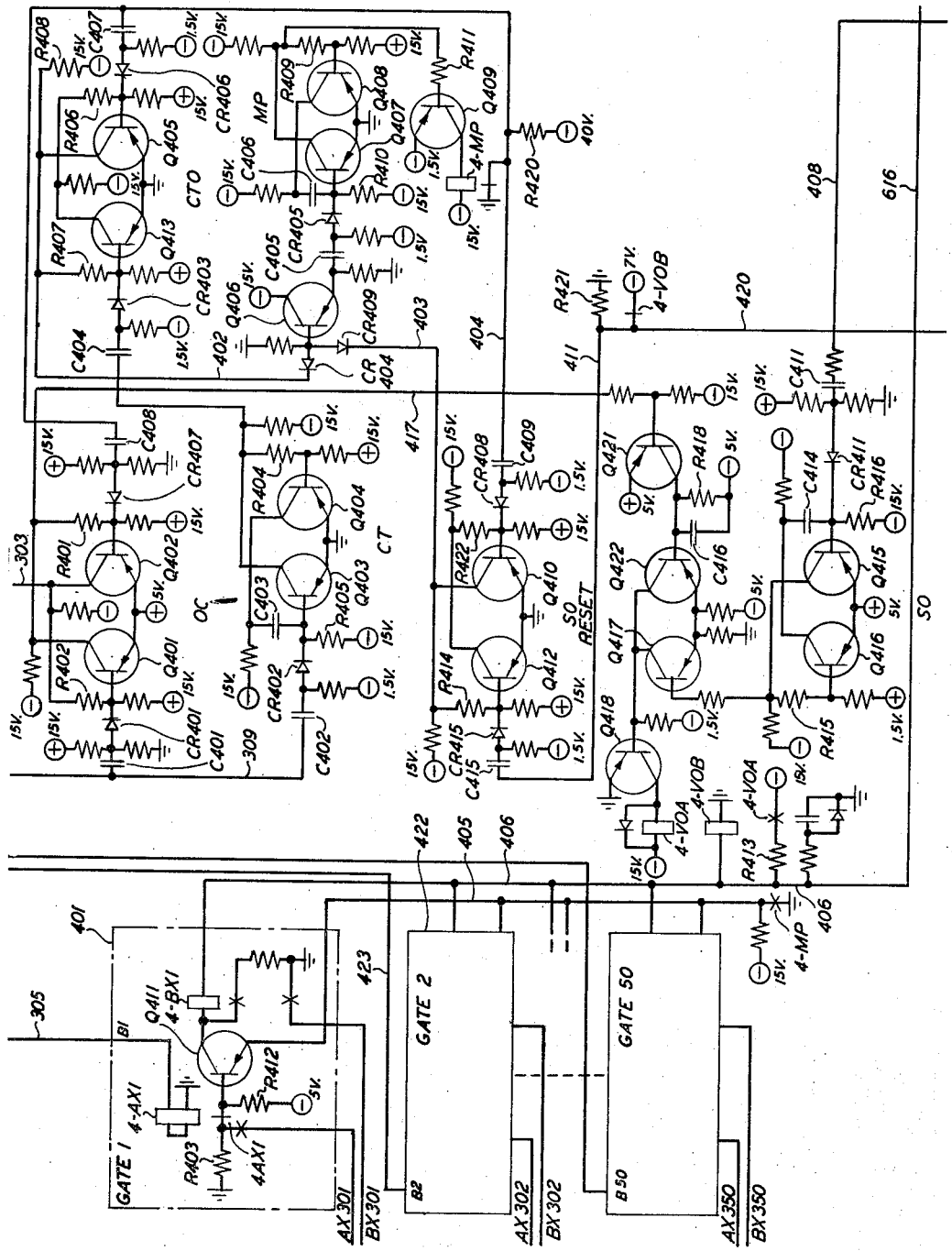

The emitter voltage of transistor Q308 rises when the transistor turns on applying a positive pulse to the base of normally conducting transistor Q401, FIG. 4, by way of lead 309, capacitor C401 and varistor CR401. Transistors Q401 and Q402 identified as the oscillator control circuit comprise a bistable circuit. The positive pulse applied to the base of transistor Q401 by way of lead 309 turns transistor Q401 off, lowering its collector voltage. The negative-going collector voltage is applied to the base of transistor Q402 by way of resistor R401 turning transistor Q402 on. This drives the collector voltage of transistor Q402 in a positive direction which tends to raise the base voltage of transistor Q401 by way of resistor R402 thus maintaining transistor Q401 off and transistor Q402 on. With transistor Q402 turned on, the positive collector voltage is applied from the collector to lead 303 and by way of resistor R305 to the base of transistor Q305. The positive voltage applied to the base of transistor Q305 maintains the transistor non-conductive, stopping the driving pulses to the above-described counter 301 shown in FIG. 3, whereby stage 1, which we have presumed is turned on, is not turned off by a driving pulse and is thus maintained on.

*First director connects to input of translator*

With transistor Q301 maintained conducting, current is drawn from ground by way of the winding of relay 4–AX1, lead 305, resistor R308, the collector-to-emitter path of transistor Q301 to negative battery. Since the first stage of the counter shown in FIG. 3 is maintained on, current is drawn by way of the winding of relay 4–AX1 a sufficient length of time to permit relay 4–AX1 to operate. The operation of relay 4–AX1 completes a path from ground by way of resistor R403, the make contact of relay 4–AX1, lead AX301 and the winding of relay 1–DAX in the first director circuit, FIG. 1, to battery, operating relay 1–DAX. As previously described here, the operation of relay 1–DAX connects the input coding leads CD1 through CD40 of the translator to the contacts of the code relays 1–CD1 through 1–CD40 of the first director. The first director 107 is thus connected to the input of the translator.

It is noted that relay 4–AX1 comprises a portion of an input gate circuit generally indicated by block 401. Gate circuit 401, which includes relay 4–AX1 and relay 4–BX1, is associated with director 1. An input gate circuit, substantially similar to circuit 401, is also associated with each of the other director circuits. For example, gate circuit 422 is associated with the second director circuit and is provided with lead AX302 which is grounded when the AX relay in gate circuit 422 operates. Lead AX302 extends to the DAX relay in the second director circuit. It is noted that the winding of the AX relay in gate 422 extends to the collector of transistor Q303 of the second stage by way of lead 423 and resistor R311, whereby the AX relay in gate 422 is operated in the event that the second stage of the counter in FIG. 3 is maintained on.

With relay 1–DAX operated, grounds are selectively applied to leads CD1 through CD40 in accordance with the address code stored in relays 1–CD1 through 1–CD40. Since it is assumed that the first character of the address code is Q, grounds are applied to leads CD1 through CD3 and CD5, as previously described.

Figure 5:
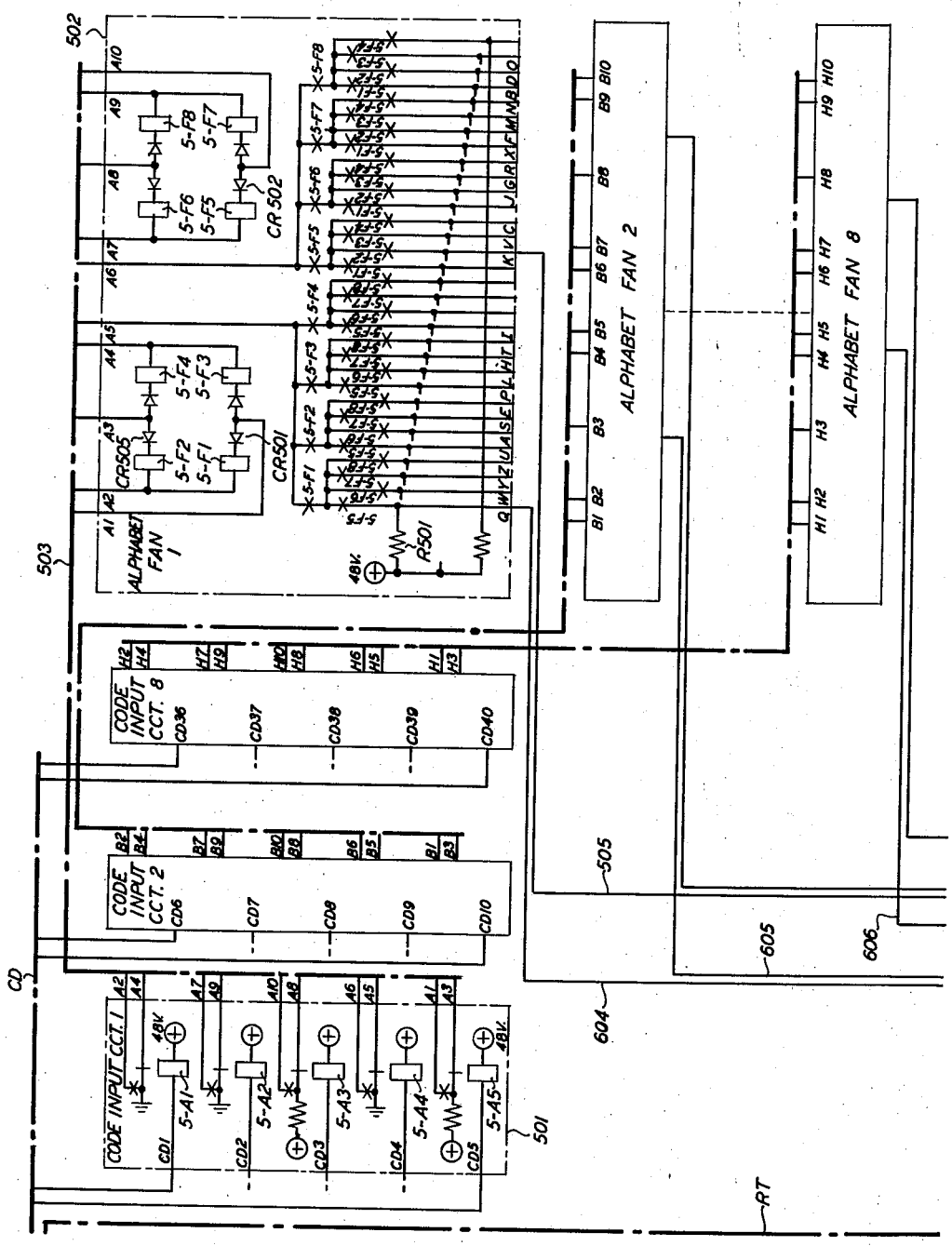

Leads CD1 through CD40 extend by way of common lead CD to similarly identified leads in the code input circuits of the translator shown in FIG. 5. Leads CD1 through CD5 extend to relays 5–A1 through 5–A5, respectively, in the first code input circuit generally indicated by block 501. Similarly, other groups of five of the CD leads extend to each of the other seven code input circuits of which code input circuit 2 and code input circuit 8 are shown in block form in FIG. 5. The other code input circuits are otherwise substantially identical to the first code input circuit 501.

It has been presumed that the first character in the address code is the letter "Q" whereby leads CD1, CD2, CD3 and CD5 are grounded. Accordingly, relays 5–A1, 5–A2, 5–A3 and 5–A5 are energized by the grounded CD leads. The operation of relay 5–A1 removes ground from terminal lead A4 and applies ground to terminal lead A2. The operation of relay 5–A2 removes ground from terminal lead A9 and applies ground to terminal lead A7. The operation of relay 5–A3 removes positive battery from lead A8 and applies positive battery to lead A10. The operation of relay 5–A5 removes positive battery from lead A3 and applies positive battery to lead A1.

Leads A1 through A10 extend from code input circuit 501 to similarly identified terminals in the first alphabet fan circuit 502 by way of a common lead 503. Similarly, the output leads B1 through B10 of the second code input circuit extend to similarly identified terminals of the second alphabet fan circuit and the output leads of each of the other six code input circuits extend to an associated alphabet fan circuit. Accordingly, eight alphabet fan circuits are provided wherein three are shown, namely, the first alphabet fan circuit generally indicated by block 502 and the second and eighth alphabet fan circuits shown in block form.

Alphabet fan circuit 502 is typical of the eight alphabet fan circuits. With ground applied to lead A2 and battery applied to lead A1, it is noted that a current path is completed from lead A1 via varistor CR501 and the winding of relay 5–F1 to lead A2 whereby relay 5–F1 is operated. With ground applied to lead A7 and battery applied to lead A10, it is noted that a current path is completed from lead A10 via varistor CR502 and the winding of relay 5–F5 to lead A7 whereby relay 5–F5 is operated. The ground on lead A5 is thus extended through make contacts 5–F1 and 5–F5 to output lead Q of the alphabet fan circuit. Thus the battery normally applied to output lead Q by way of resistor R501 is removed by the application of ground to lead Q from lead A5. Similarly, it is apparent that the energization of leads CD1 through CD5 in accordance with any other teletypewriter character will remove battery from the output lead associated with that teletypewriter character and apply ground thereto.

In the same manner the energization of leads CD6 through CD10 in accordance with the second character of the address code removes battery from an output lead in the second alphabet fan circuit associated with that character and applies ground thereto when leads CD6 through CD10 are extended from the director to the second code input circuit.

Figure 6:
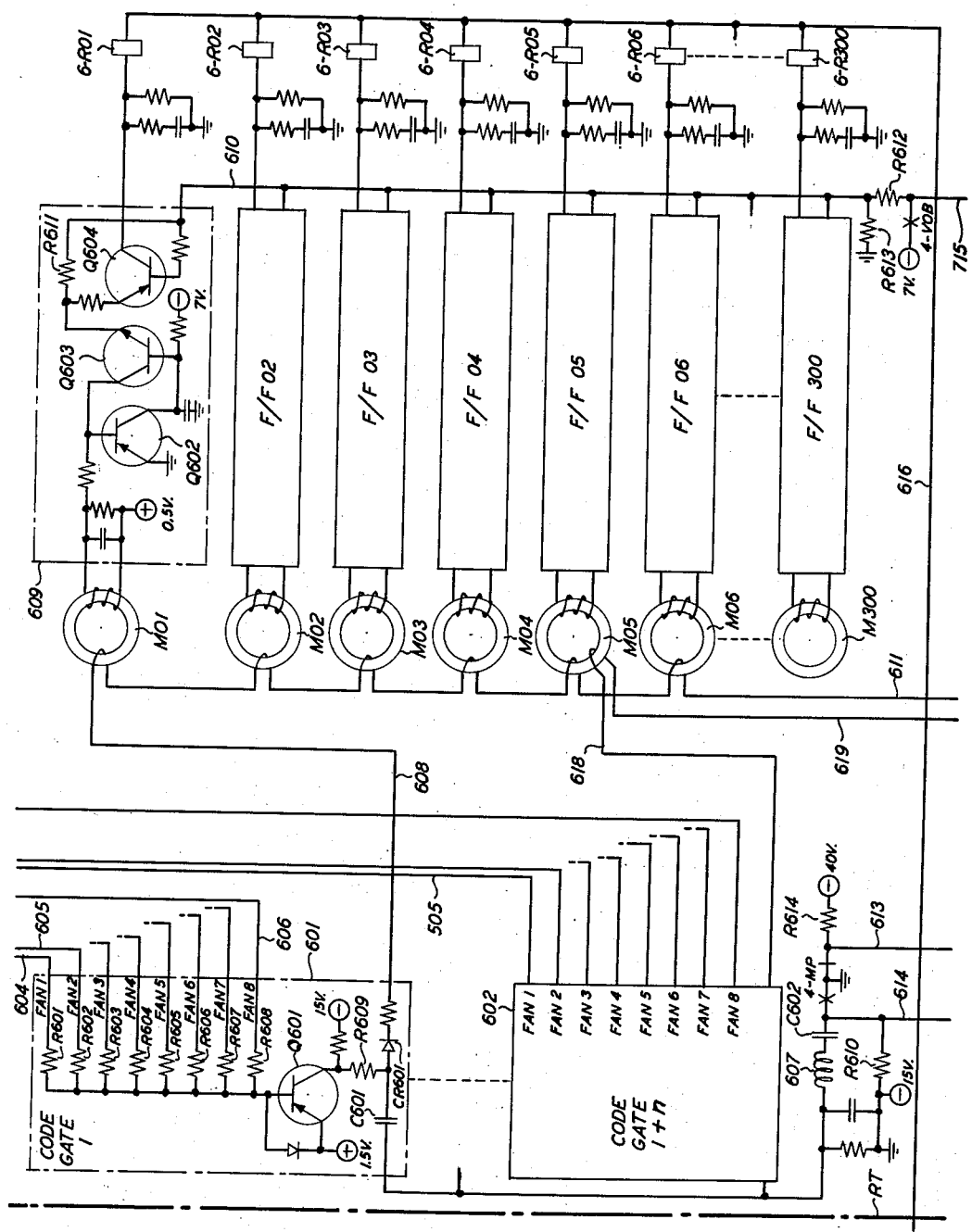

The output leads of the eight fan circuits extend to the code gate circuits shown in FIG. 6. Three hundred code gate circuits are provided wherein code gate circuit 601 is shown in detail and code gate circuit 602 is shown in block form. Code gate 601 which is similar to each of the other code gates comprises a transistor-resistor AND gate which includes transistor Q601 and a plurality of resistors identified as resistors R601, R602, R603, R604, R605, R606, R607 and R608. One terminal of each of the above-identified resistors is connected to the base of transistor Q601. The other terminal of each of resistors R601 through R608 is connected to an output terminal of alphabet fan circuits 1 through 8, respectively. It is noted that resistor R601 is connected to output terminal Q of the first alphabet fan circuit by way of lead 604. Resistor R602 is connected to output terminal of the second alphabet fan circuit by way of lead 605. Resistor R608 is connected to output terminal of the eighth alphabet fan circuit by way of lead 606.

The emitter of transistor Q601 is maintained, for example, approximately 1.5 volts positive or slightly above ground. Accordingly, it is apparent that the application of a positive voltage to one or more of the input leads, such as leads 604, 605 or 606, would maintain the base voltage of transistor Q601, by way of resistors R601 through R608, more positive than the emitter voltage whereby transistor Q601 does not conduct. In the event that all of the leads to code gate 601, such as leads 604 through 606, from the eight alphabet fan circuits are grounded in accordance with the address code, the base voltage of transistor Q601 drops substantially to ground whereby transistor Q601 conducts, driving its collector in a positive direction. This positive voltage is applied to the junction of gate varistor CR601 and capacitor C601 by way of resistor R609. Varistor CR601 is thus forward biased by the positive voltage applied thereto. Accordingly, one gate, such as varistor CR601, of the three hundred gates in the code gate circuits is forward biased by the address code stored in the director.

*First director connects to output of translator*

Returning now to the operation of the monostable circuit comprising transistors Q308 and Q307, it is recalled that a positive-going pulse is applied to lead 309 when transistor Q308 conducts. This positive pulse, in addition to being applied to the base of transistor Q401, is applied to the base of transistor Q403 by way of lead 309, capacitor C402 and varistor CR402.

Transistors Q403 and Q404 are identified as the code-timer circuit and are arranged as a monostable circuit wherein transistor Q403 is normally conducting and transistor Q404 is normally nonconducting. The positive pulse applied to the base of transistor Q403 raises the base potential sufficiently to cut off the transistor. The voltage on the collector of transistor Q403 is thus driven in a negative direction lowering the voltage applied to the base of transistor Q404 by way of resistor R404. The lowered base voltage of transistor Q404 permits this transistor to start conducting, raising the collector voltage of transistor Q404 which increased voltage is applied to the base of transistor Q403 by way of capacitor C403, momentarily maintaining transistor Q403 nonconducting. Capacitor C403 discharges to negative battery by way of resistor R405 thus lowering the voltage of the base of transistor Q403 whereby, after approximately 18 milliseconds, transistor Q403 again turns on raising its collector voltage and thus turning off transistor Q404.

The resultant positive-going collector voltage of transistor Q403, when the code-timer times out, is applied to the base of transistor Q413 by way of capacitor C404 and varistor CR403. Transistors Q413 and Q405, which are identified as the code time-out circuit, comprise a bistable arrangement wherein transistor Q413 is normally conducting.

The application of the positive pulse from the collector of transistor Q403 to the base of transistor Q413 turns transistor Q413 off. This results in a negative voltage transition on the collector of transistor Q413 which is applied to the base of transistor Q405 by way of resistor R406. The negative-going voltage applied to the base of transistor Q405 turns on the transistor raising its collector voltage and the increased voltage is applied to the base of transistor Q413 by way of resistor R407, thus maintaining transistor Q413 nonconducting and transistor Q405 conducting.

The positive-going transition of the collector of transistor Q405 is applied by way of lead 402 to varistor CR404, whereby the negative potential normally applied to the base of normally conducting transistor Q406 by way of varistor CR404, lead 402 and resistor R408 to negative battery is removed. Assuming that lead 403 is at this time in a positive voltage condition, the positive transition of lead 402 removes the above-described negative potential on the base of transistor Q406 and transistor Q406 is turned off. This results in a positive transition on the emitter of transistor Q406 which is applied to the base of transistor Q407 by way of capacitor C405 and varistor CR405.

Transistors Q407 and Q408, identified as the matrix pulse circuit, comprise a monostable circuit wherein transistor Q407 is normally conducting and transistor Q408 is normally nonconducting. The application of the positive pulse to the base of transistor Q407 turns the transistor off, lowering its collector voltage which is applied to the base of transistor Q408 by way of resistor R409. The decreased base voltage of transistor Q408 turns the transistor on, thus applying a positive pulse from the collector of transitor Q408 to the base of transistor Q407 by way of capacitor C406. The positive charge of capacitor C406, however, is discharged to negative battery by way of resistor R410 whereby, after approximately 15 milliseconds, the base potential of transistor Q407 is lowered sufficiently to permit the transistor to turn on again, thereby turning off transistor Q408.

During the time the matrix pulse circuit is timing and transistor Q407 is off, the negative-going voltage on the collector of transistor Q407 is applied to the base of transistor Q409 by way of resistor R411. Transistor Q409 is thus turned on while the matrix pulse circuit is timing. With transistor Q409 conducting, current is applied by the collector to negative battery by way of the winding of relay 4–MP. Accordingly, relay 4–MP is momentarily operated for the interval that the matrix pulse circuit is timing out.

Relay 4–MP operated momentarily applies ground to lead 405 which extends to the emitter of transistor Q411 in gate 401. Similarly, lead 405 extends to the emitters of the transistors in the other gates in FIG. 4. With relay 4–AX1 operated, removing ground applied to the base of transistor Q411 by way of resistor R403 and the break contact of relay 4–AX1, negative potential is applied to the base of transistor Q411 by way of resistor R412. With the collector of transistor Q411 at ground and the base at a relatively negative potential, transistor Q411 momentarily turns on, applying collector current by way of winding relay 4–BX1, lead 406, resistor R413, the make contacts of normally operated contacts 4–VOA to negative battery, operating relay 4–BX1 which locks by way of its make contact to ground. Relay 4–BX1 operated, applies ground to lead BX301 which extends to relay 1–DBX of the first director circuit 107 in FIG. 1. As previously described, relay 1–DBX operated, extends leads RT000 through RT300 to the windings of relays 1–RT000 through 1–RT300. Leads RT000 through RT300 extend via multiple lead RT to similarly identified output leads of the translator shown in FIG. 7 whereby the route relays of the first director are connected to the output of the translator.

The momentary operation of relay 4–MP also generates the matrix or translate pulse which is applied to the code gates shown in FIG. 6. The operation of relay 4–MP applies ground to the right-hand plate of capacitor C602 as shown in FIG. 6. Since negative voltage was previously applied to the right-hand plate of capacitor C602 by way of resistor R610, the application of ground by way of the make contacts of relay 4–MP applies a positive pulse via capacitor C602 and inductor 607 to capacitor C601 and corresponding capacitors in the other code gates. Since varistor CR601 is the only gate varistor that is forward biased, this positive pulse is applied via capacitor C601 and varistor CR601 to lead 608.

Figure 7:
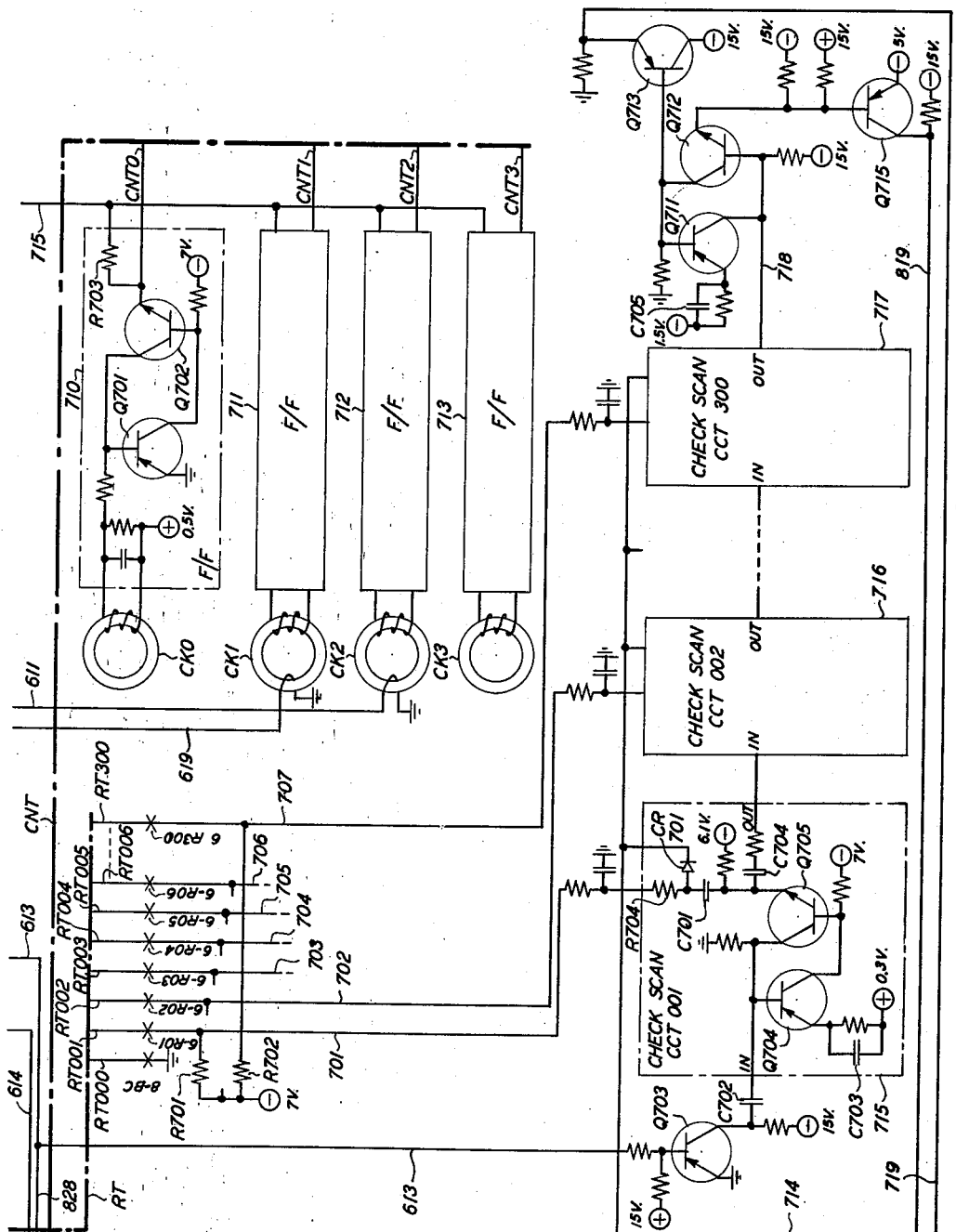

Output lead 608 and the output lead of each of the other code gate circuits extend to a magnetic ring circuit which includes 300 magnetic rings, M01 through M300, and further extend to four check rings, CK0 through CK3, shown in FIG. 7. The magnetic ring circuit also includes 300 flip-flops, each associated with an individual ring wherein flip-flop 1, generally indicated by block 609, is associated with ring M01. Flip-flops 2, 3, 4, 5, 6 and 300, are shown in block form associated with similarly numbered magnetic rings.

The magnetic rings are similar to the type described in Patent 2,599,358 granted to H. D. Cahill et al. on June 3, 1952. As disclosed in detail in the above-mentioned Cahill et al. patent, each of the rings functions similarly to a transformer wherein a pulse is produced in the output winding in response to a voltage pulse applied to an input winding. The memory rings are wound such that a negative output pulse is produced by the application of a positive input pulse.

Tracing lead 608, it is noted that a single turn is threaded through rings M01, M02, M03, M04, M05 and M06 and is then extended by way of lead 611 through ring CK2, FIG. 7, and then to ground. Thus the application of the positive pulse to lead 608 produces a negative output pulse from rings M01, M02, M03, M04, M05 and M06 and ring CK2.

The negative output pulse from ring M01 is applied to the phase of transistor Q602 in flip-flop circuit 609, turning on transistor Q602. The collector of transistor Q602 is driven in a positive direction raising the voltage on the base of transistor Q603 which starts to conduct. With transistor Q603 conducting, its collector is driven in a negative direction, lowering the voltage on the base of transistor Q602 whereby transistors Q602 and Q603 are maintained conducting. It is noted that the emitter current of transistor Q603 is applied by way of resistor R611 to lead 610 which is common to similar leads in each of the other flip-flop circuits. Lead 610 is connected to the junction of resistors R612 and R613 which form a voltage divider between ground and negative battery by way of the make contacts of normally operated relay 4–VOB and thereby supply the negative source for the emitter of transistor Q603.

With transistor Q603 conducting, the emitter is driven in a positive direction raising the voltage on the emitter of transistor Q604. Since the base of transistor Q604 is connected to lead 610 and lead 610 is connected to a negative source of supply, transistor Q604 is turned on. Current is thus applied from the collector of transistor Q604 through the winding of route repeat relay 6–R01 to lead 616 which is connected to similar terminals on the windings of the other route repeat relays. Lead 616 then extends to negative battery by way of lead 406, resistor R413, FIG. 4, and the make contacts of normally operated relay 4–VOA. Accordingly, relay 6–R01 is operated.

Similarly, the application of the positive pulse on lead 608 to rings M02, M03, M04, M05 and M06 operate relays 6–R02, 6–R03, 6–R04, 6–R05 and 6–06.

Referring now to FIG. 7, 301 leads, identified as leads RT000 through RT300, extend by way of common lead RT to similarly identified leads in each of the director circuits, as previously described. In addition, leads RT001 through RT300 extend by way of the make contacts of relays 6–R01 through 6–R300, respectively, to negative battery. For example, leads RT001 through RT006 and lead RT300 extend by way of the make contacts of relays 6–R01 through 6–R06 and 6–R300, respectively, to leads 701 through 707, respectively. As shown in FIG. 7, lead 701 is connected to −7 volt battery by way of resistor R701 and lead 707 is connected to −7 volt battery by way of resistor R702. Similarly, each of the other leads is connected to −7 volt battery by way of an individual resistor.

Returning now to the operation of relay 6–R01, a path is completed from −7 volt battery by way of resistor R701, the make contact of relay 6–R01, lead RT001, common lead RT, lead RT001 in the first director, FIG. 1, make contact 1–DBX, and the winding of the director route relay 1–RT001 to negative 48-volt battery, operating relay 1–RT001 which locks to ground by way of its own make contact. Similarly, the operation of relay 6–R02 operates relay 1–RT002, the operation of relay 6–R03 operates relay 1–RT003, the operation of relay 6–R04 operates relay 1–RT004, the operation of relay 6–R05 operates relay 1–RT005, and the operation of relay 6–R06 operates relay 1–RT006 and the RT relays lock to ground in the same manner as previously described for relay 1–RT001.

The operation of the six above-mentioned director route relays in accordance with the address code now functions to prepare cross-office paths from the first input line circuit 102 to the outgoing link circuits. A typical method of preparing these cross-office paths is disclosed in the above-mentioned Bacon et al. patent.

*Translator scans for other bids*

Returning now to the momentary operation of relay 4–MP, relay 4–MP operated also removes ground from lead 404 whereby negative battery is applied to the lead by way of resistor R420. It is noted that lead 404 extends to the base of transistor Q405 in the code time-out circuit by way of capacitor C407 and varistor CR406. Lead 404 also extends to the base of transistor Q402 in the oscillator control circuit by way of capacitor C408 and varistor CR407. In addition, lead 404 extends to transistor Q410 by way of capacitor C409 and varistor CR408.

The subsequent release of relay 4-MP reapplies ground to lead 404, removing the negative potential supplied to the lead by way of resistor R420. The resultant positive transition of lead 404 is applied by way of capacitor C408 and varistor CR407 to the base of transistor Q402 turning the transistor off. Transistor Q402 turned off, turns transistor Q401 on, thereby resetting the oscillator control circuit. With transistor Q402 turned off, the positive potential on lead 303 is removed, removing the positive blocking potential applied to the base of transistor Q305 by way of resistor R305, whereby the oscillator again begins to oscillate and apply driving pulses to the sequence counter shown in FIG. 3. Thus the sequence scanner of FIG. 3 again begins to scan for another bidding director.

The positive voltage transition of lead 404 is also applied by way of capacitor C407 and varistor CR406 to the base of transistor Q405 turning the transistor off. With transistor Q405 turned off, transistor Q413 is turned on, thus resetting the code time-out circuit. With transistor Q405 turned off, its negative collector potential is again applied to the base of transistor Q406 by way of lead 402 and varistor CR404 whereby transistor Q406 again turns on.

The positive transition of lead 404 is also applied to the base of transistor Q410 by way of capacitor C409 and varistor CR408. Transistors Q410 and Q412, identified as the set-zero-reset circuit, comprise a bistable circuit wherein transistor Q410 is normally conducting and transistor Q412 is normally nonconducting. The application of a positive pulse to the base of transistor Q410 turns the transistor off. This lowers the voltage potential on the collector of transistor Q410 which in turn lowers the base potential of transistor Q412 by way of resistor R414. Transistor Q412 is thus turned on increasing its collector voltage and thus increasing the base voltage of transistor Q410 by way of resistor R422. With transistor Q410 turned off and the collector voltage driven in a negative direction, the voltage of lead 403 is driven negative and applies a negative potential to the base of transistor Q406 by way of varistor CR409. It is thus seen that transistor Q406 is maintained conducting if transistor Q410 is nonconducting or transistor Q405 is nonconducting.

Returning now to sequence scanner of FIG. 3, the reactivation of transistor-oscillator Q305 and the resultant application of the first driving pulse to the counter, turns off transistors Q301 and Q302 in stage 1 and operates transistors Q303 and Q304 in stage 2 as previously described.

When transistor Q301 turns off, its collector current by way of relay 4-AX1 is terminated and relay 4-AX1 releases. The release of relay 4-AX1 removes the ground applied to lead AX301 by way of resistor R403 thereby opening the previously-described operating path of relay 1-DAX in the first director, FIG. 1. The consequent release of relay 1-DAX opens the connection between the contacts of code relays CD1 through CD40 to the code input circuits, FIG. 5, of the translator via leads CD1 through CD40. The operated ones of the code input circuit relays, such as relays 5-A1 through 5-A3, release, releasing in turn the fan relays, such as relays 5-F1 and 5-F5. The release of the alphabet fan relays restores transistor Q601 to the nonconducting state and the enabling voltage is removed from varistor CR601. The input circuit, the fans and the code gates are now restored to their initial conditions.

Since we have assumed that the second director circuit is bidding, whereby negative potential is applied to lead BID2, the operation of stage 2 with negative potential on lead BID2 applies a negative pulse to the base of transistor Q306 by way of varistor CR303 and lead 306 in the same manner as the negative pulse was applied to lead 306 from lead BID1 by way of varistor CR301. As previously described, the negative pulse applied to lead 306 turns transistor Q306 on and Q306 in turn, turns on the monostable circuit comprising transistors Q307 and Q308. The resultant positive-going potential of the collector of transistor Q308 is applied to the oscillator control circuit comprising transistors Q401 and Q402 and the code-timing circuit comprising transistors Q403 and Q404 in the same manner as previously described. Transistor Q401 is thus turned off, turning on transistor Q402 which raises the voltage on lead 303 thus blocking transistor Q305. The blocking of transistor Q305 terminates the driving pulses for the counter and stage 2 is maintained operated whereby the AX relay in gate 422 is operated in the same manner as previously described for the operation of relay 4-AX1.

The application of the positive pulse to the base of transistor Q403 turns the transistor off, turning on in turn transistor Q404. As previously described, transistor Q403 subsequently turns back on, applying a positive pulse to the base of transistor Q413 by way of capacitor C404 and varistor CR403. This turns off transistor Q413 of the code time-out circuit, turning on transistor Q405, as previously described. With transistor Q405 turned on, the negative potential applied to the base of transistor Q406 by way of varistor CR404 and lead 402 is removed. However, it is recalled that transistor Q410 of the set-zero-reset circuit is turned off at this time, whereby a negative potential is maintained on the base of transistor Q406 by way of lead 403 and varistor CR409. Thus transistor Q406 is maintained conducting until the condition of the set-zero-reset circuit is reversed as described hereinafter.

The operation of the AX relay in gate 402 applies ground to lead AX302 in the same manner as relay 4-AX1 applied ground to lead AX301. The grounded lead AX302 extends to the winding of the DAX relay in the second director circuit 205. The consequent operation of the DAX relay extends leads CD1 through CD40 to the contacts of the CD relays in the second director circuit 205, as previously described, whereby the leads are grounded in accordance with the address code of the message stored in incoming line circuit 203.

Since it is assumed that the first character in the address code is K, leads CD1 through CD4 are grounded, operating relays 5-A1 through 5-A4 in code input circuit 501. With relay 5-A5 released and relay 5-A1 operated, a path is extended from positive battery on lead A3 to ground on lead A2 by way of varistor CR505 and relay 5-F2 in the alphabet fan circuit 502. The operations of relays 5-A2 and 5-A3 operate relay 5-F5, as previously described. With relay 5-A4 operated, ground is thus applied to lead A6 and extended to output terminal K of fan circuit 502 by way of the make contacts of relays 5-F5 and 5-F2.

Output terminal K of fan circuit 502 is connected to code gate 602 by way of lead 505. Assuming that the other similar leads from the other fan circuits to code gate 602 are also grounded, the transistor in code gate 602 corresponding to transistor Q601 turns on, enabling in turn the gate varistor in code gate 602 corresponding to varistor CR601. Accordingly, the gate varistor in code gate 602 is selectively enabled by the second address code.

*Translator checks operation of route relays*

Returning now to the operation of the route relays in first director 107 and more particularly to operation of relay 1–RT001, ground is applied by way of the relay's locking contact, the make contact of relay 1–DBX, lead RT001, multiple lead RT, lead RT001, in FIG. 7, and make contact 6–R01 to lead 701. Accordingly, the negative potential applied to lead 701 by the negative 7-volt battery by way of resistor R701 is removed and the potential on lead 701 is raised to ground. Similarly, the potentials on leads 702 through 706 are raised to ground by the operation of relays 1–RT002 through 1–RT006. This positive-going potential which is applied over the same lead that was previously employed for the operation of the director route relay is utilized to check whether the proper number of director route relays have operated in a manner described hereinafter.

As previously described, the positive pulse on lead 608 which is applied to predetermined magnetic rings in FIG. 6 is also applied to check ring CK2, shown in FIG. 7, by way of lead 611. Four check rings are provided, as shown in FIG. 7, to indicate the count to base 4 of the number of magnetic rings M01 through M0300 that are energized. For example, if a lead similar to lead 608 is threaded through 1, 5 or 9, etc., of the M0 rings, the lead similar to lead 611 would be threaded through ring CK1. Similarly, if the lead is threaded through 2, 6 or 10, etc., of the M0 rings, it would also be threaded through ring CK2 and if the lead is threaded through 4, 8 or 12, etc., of the M0 rings, it would also be threaded through ring CK0.

Each of the check rings are similar to the M0 rings and provide a negative output pulse in response to a positive pulse on an input lead. The output of rings CK0 through CK3 is connected to individual flip-flop circuits 710 through 713, respectively, wherein flip-flop circuit 710 is shown in detail and flip-flop circuits 711 through 713 are shown in block form.

Flip-flop circuit 710, which is identical to the other flip-flop circuits, includes transistors Q701 and Q702. In the event that a positive pulse is applied to the input of ring CK0, a negative output pulse is applied to the base of transistor Q701, turning on the transistor. The collector of transistor Q701 is driven in a positive direction and this positive-going potential is applied to the base of transistor Q702. Transistor Q702 turns on, driving its collector potential in a negative direction thereby applying a negative potential to transistor Q701 maintaining the two transistors conducting. It is noted that the current path for the emitter of transistor Q702 extends by way of resistor R703 to lead 715 which is common to similar leads in flip-flop circuits 711 through 713. Lead 715 extends to negative battery by way of the make contacts of relay 4–VOB in FIG. 6. With transistor Q702 conducting, its emitter potential is driven in a positive direction and this positive transition is applied to lead CNT0.

As previously described, a positive pulse is applied to lead 608 in accordance with the translation by the fan circuits of the address code stored in director 1. Lead 608 extends through the M0 rings as previously described, and then by way of lead 611 is threaded through ring CK2 to ground. Ring CK2 in response to positive pulse applied thereto, applies a negative pulse to flip-flop 712. Flip-flop 712 in turn applies a positive-going potential on lead CNT2 in the same manner as previously described for flip-flop 710.

Lead 701 which, as previously described, was grounded by the locking contact of the first director route relay RT–001, extends to the first stage of a 300-stage check scan counter. Each of the other 300 leads extends to other individual stages of the counter.

As shown in FIG. 7, the details of the first stage of the counter is identified as 715. Stage 2 and stage 300 are identified by blocks 716 and 717, respectively, and the intermediate stages are not shown. The circuitry of each of the 300 stages is substantially identical.

Ground on lead 701 is extended by way of resistor R704 to the junction of capacitor C701 and varistor CR701. Since the potential on lead 701 was previously approximately −7 volts, the application of the ground to varistor CR701 forward biases the varistor. Similarly, the application of ground to leads 702 through 706 forward biases similar varistors in stages 2 through 6 of the check scan circuit.

As previously described, the matrix pulse is terminated by the release of relay 4–MP. The release of relay 4–MP applies ground by way of its break contact to lead 613, FIG. 6. Lead 613, which previously had a negative potential supplied thereto by way of resistor R614, applies the ground to the base of normally conducting transistor Q703, FIG. 7. The increased positive potential applied to the base of transistor Q703 turns the transistor off. The potential of the collector of transistor Q703 is driven in a negative direction applying a negative pulse to the base of transistor Q704 by way of capacitor C702.

Transistors Q704 and Q705, which are included in the first stage 715 of the check scan counter, comprise a monostable multivibrator. The application of the negative pulse to the base of transistor Q704 turns the transistor on. This increases the potential on the collector of transistor Q704 which is applied to the base of transistor Q705, turning on transistor Q705. With transistor Q705 conducting, its emitter potential is driven in a positive direction applying a positive pulse to the junction of resistor R704 and varistor CR701 by way of capacitor C701. Since, as previously described, varistor CR701 is forward biased, a positive pulse is applied to lead 714. It is apparent that if varistor CR701 had not been forward biased by lead 701, a positive pulse would not be applied to lead 714 when stage 715 turns on.

While transistors Q704 and Q705 are conducting, capacitor C703 is being negatively charged by the emitter current of transistor Q704. When the emitter voltage, as determined by the charging of capacitor C703, is no longer positive with respect to the base voltage, transistor Q704 turns off, turning off in turn transistor Q705. This drives the emitter voltage of transistor Q705 in a negative direction applying a negative pulse by way of capacitor C704 to the input of second stage 716, thus turning on the monostable multivibrator in stage 716 in the same manner as previously described for transistors Q704 and Q705. Since the varistor in stage 716, similar to varistor CR701 in stage 715, is also forward biased, a second positive pulse is applied to lead 714. Similarly, a positive pulse is applied to lead 714 each time the monostable multivibrator is turned on and the varistor in the stage, similar to varistor CR701, is forward biased. Accordingly, since leads 701 through 706 are grounded, six successive positive pulses are applied to lead 714.

Figure 8:
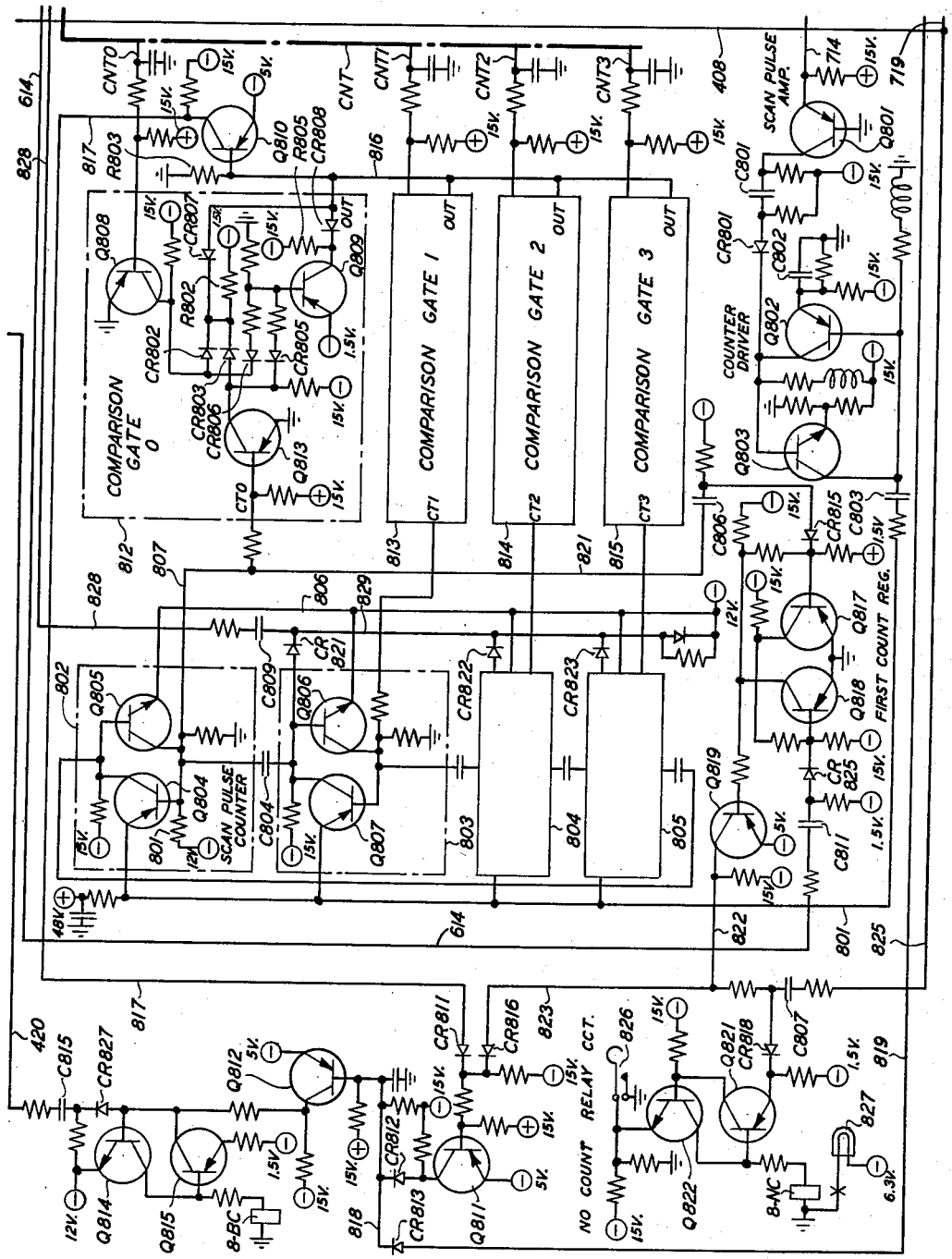

Each positive pulse on lead 714 is applied to the emitter of transistor Q801, FIG. 8, momentarily turning on the transistor. The potential on the collector is driven in a positive direction applying a positive pulse by way of capacitor C801 and varistor CR801 to the base of transistor Q803. Transistor Q803 with transistor Q802 comprise a monostable multivibrator. The positive pulse applied to the base of transistor Q803 turns the transistor on. The potential on the collector of transistor Q803 is driven in a negative direction and this negative transition applied to the base of transistor Q802 turns transistor Q802 on. With transistors Q803 and Q802 conducting, capacitor C802 in the emitter circuit of transistor Q802 is negatively charged by the emitter current of the transistor. When the emitter voltage of transistor Q802 is no longer positive relative to the base, transistor Q802 turns off, turning off in turn transistor Q803.

While transistor Q803 is conducting, its collector is driven in a negative direction applying a negative pulse by way of capacitor C803 to lead 801. Accordingly, since six positive pulses are applied to lead 714, six negative pulses are applied to lead 801.

Lead 801 extends to the inputs of a 4-stage scan pulse counter. The first stage of the counter identified as 802, and the second stage identified as 803, are shown in detail. The third and fourth stages of the counter are shown as blocks 804 and 805, respectively. Stage 802 of the scan pulse counter which is substantially identical to the other stages, includes transistors Q804 and Q805 which comprise a bistable circuit. Stage 802 differs slightly from the other stages, however, in so far as the base of transistor Q804 is maintained slightly negative due to negative battery being applied to the base by way of resistor R801. Since a negative potential is applied to the base of transistor Q804, the transistor is normally on, applying its positive-going collector potential to the base of transistor Q805, turning on transistor Q805.

With transistors Q804 and Q805 conducting, the potential on the collector of transistor Q805 is driven in a negative direction and the negative transition is applied to the base of transistor Q813 by way of lead 807. Transistor Q813 is thus rendered conducting.

Transistor Q813 is included in comparison gate 812 which is associated with counter stage 802. Comparison gates 813, 814 and 815 which are identical to comparison gate 812, are associated with counter stages 803, 804 and 805, respectively. Thus when a counter stage multivibrator turns on, the transistor in the associated comparison gate similar to transistor Q813 turns on.

Returning now to the application of the negative pulses on lead 801, the negative transition at the leading edge of the pulse is applied to the emitter of transistor Q804, turning the transistor off. Transistor Q805 is in turn turned off and the positive-going potential of its collector is applied by way of capacitor C804 to the base the transistor Q806, turning transistor Q806 on. With transistor Q806 conducting, the potential on its collector is driven in a negative direction and the negative potential is applied to the base of transistor Q807. When the negative pulse applied to lead 801 is removed, transistor Q807 starts to conduct since its base has been rendered negative. Similarly, each successive stage is turned on by the application of the negative pulses on lead 801. When the six negative pulses have been applied to lead 801, counter stage 804 turns on and is maintained on in the absence of any further input pulses. With stage 804 turned on, the transistor similar to transistor Q813 in comparison gate 814 is rendered conducting.

Returning now to the application of the positive pulse to lead CNT2 by check flip-flop 712 in FIG. 7, lead CNT2 is traced by way of common multiple CNT to similarly identified lead CNT2 in FIG. 8. Similarly, CNT0, CNT1 and CNT3 extend to similarly identified leads in FIG. 8. Referring to lead CNT0, this lead extends to the base of transistor Q808 in comparison gate 812.

As previously described, the CNT leads are normally maintained negative due to negative battery applied by way of the make contacts of normally operated relay 4–VOB, FIG. 6, lead 715, resistor R703, and the similar resistors in flip-flops 711 to 713, and then to leads CNT0 to CNT2 whereby each corresponding transistor Q808 in the comparison gates is normally conducting.

Assuming that flip-flop 710 has been operated, the negative potential on lead CNT0 would be removed whereby transistor Q808 is rendered nonconducting. With transistor Q808 rendered nonconducting, the resultant negative potential on its collector is applied to varistors CR802 and CR806. Assuming that transistor Q813 has been rendered conducting, as previously described, the resultant positive potential on its collector is applied to varistors CR803 and CR805.

Varistor CR802 with varistor CR803 comprise an OR gate; similarly, varistor CR806 with varistor CR805 comprise an OR gate. The application of a positive pulse to either varistor CR802 or varistor CR803 renders the junction between resistor R802 and varistor CR807 positive and this positive-going potential removes the negative potential applied to lead 816 by way of resistor R802 and varistor CR807. The application of a negative pulse to varistor CR806 or varistor CR805 is applied to the base of transistor Q809, rendering the transistor conducting. The resultant positive voltage transition on the collector of transistor Q809 removes the negative potential applied to lead 816 by way of resistor R805 and varistor CR808. Thus, lead 816 is maintained substantially at ground potential by way of resistor R803 whereby transistor Q810 whose base is connected to lead 816 is maintained nonconducting. This indicates a correct comparison. Accordingly, no output is obtained from comparison gate 814 when the transistor corresponding to transistor Q813 is conducting and the transistor corresponding to transistor Q808 is nonconducting. Similarly, no output is obtained when transistor Q813 is turned off and normally conducting transistor Q808 is turned on.

Since it is assumed that counter stage 804 is turned on and the positive transition is applied to lead CNT2, the transistor corresponding to transistor Q813 in comparson gate 812 is at this time not conducting and transistor Q808 is conducting. Accordingly, the collector of transistor Q808 applies a positive potential to varistors CR802 and CR806 and the collector of transistor Q807 applies a negative potential to varistors CR803 and CR805. Thus negative voltage is applied through varistor CR805 to the base of transistor Q809 and positive voltage is applied by way of varistor CR802 to the junction of resistors R802 and R803 and varistor CR807. Thus, lead 816 is maintained substantially at ground, as previously described. Similarly, no outputs are provided by comparison gates 813 and 815 since the transistor corresponding to transistor Q813 is off and transistor Q808 is on.

*First director disconnected from translator output*

Returning now to the check scan counter shown in FIG. 7, the operation of the last stage 717 provides a positive pulse on the emitter of the transistor corresponding to transistor Q705 in the first stage 715. This provides a positive pulse through the capacitor corresponding to capacitor C704 whereby a positive pulse is applied to lead 718. Lead 718 extends to the base of transistor Q712 which, with transistor Q711, comprise a monostable multivibrator. The application of the positive pulse of the base of transistor Q712 turns on the transistor, driving its collector potential in a negative direction which is applied to the base of transistor Q711. Transistor Q711 turns on and capacitor C705 commences to be charged negatively by the emitter current of transistor Q711. When capacitor C705 is sufficiently charged, transistor Q711 turns off, turning off in turn transistor Q712.

While transistor Q712 is conducting, the negative-going potential on its collector is applied to the base of transistor Q713, turning transistor Q713. This drives the emitter of transistor Q713 in a negative direction. When transistor Q712 subsequently turns off, transistor Q713 turns off and the resultant positive-going potential of its emitter is applied to lead 719 and then by way of lead 408, capacitor C411 and varistor CR411, FIG. 4, to the base of transistor Q415.

Transistors Q415 and Q416, the set-zero circuit, comprise a monostable multivibrator. The positive pulse applied to the base of normally conducting transistor Q415 turns the transistor off and the resultant negative-going potential on the collector of transistor Q415 is applied to the base of transistor Q416 by way of resistor R415, turning transistor Q416 on. The lower plate of capacitor C414, as shown in FIG. 4, is positively charged by the incoming positive pulse applied to the base of transistor Q415 and the positive-going potential of the collector of transistor Q416. Capacitor C414 now discharges by way of resistor R416, lowering the base potential on transistor Q415 whereby transistor Q415 turns back on after approximately 15 milliseconds. Transistor Q415, upon turning on, turns off transistor Q416.

While the set-zero circuit is timing and transistor Q415 is nonconducting, the negative-going potential on its collector is applied to the base of transistor Q417, momentarily rendering transistor Q417 conducting. The resultant positive-going potential on the collector of transistor Q417 is applied to the base of normally conducting transistor Q418, momentarily rendering transistor Q418 nonconducting. The removal of the collector current of transistor Q418 which is applied by way of the winding of relay 4–VOA to negative battery, momentarily releases relay 4–VOA.

The release of relay 4–VOA removes negative battery from lead 406 by way of resistor R413 and from lead 616 which extends to lead 406. With negative battery removed from lead 406, the operating-locking path of relay 4–BX1 is open, releasing the relay. The release of relay 4–BX1 releases relay 1–DBX in the first director whereby the translator route leads RT000 through RT300 are disconnected from the first director.

It is noted at this time that the release of the first director from the output of the translator is delayed after the completion of the scan of the route leads by the check scan circuit of FIG. 7 by the cumulative intervals of time required for the timing out of the monostable multivibrator comprising transistors Q711 and Q712 and the sequential release of relays 4–VOA, 4–BX1 and 1–DBX. As described hereinafter, it may be desirable to operate relay 1–RT000 after the check scan circuit scans the route leads. Accordingly, the interval required for the timing out of transistors Q711 and Q712 and the sequential release of relays 4–VOA, 4–BX1 and 1–DBX are such that relay 1–RT000 may operate, if desired, after the scan before relay 1–DBX releases.

The release of relay 4–VOA also opens the operating circuit of relay 4–VOB which extends from negative battery by way of the make contacts of relay 4–VOA, resistor R413, lead 406 and the winding of relay 4–VOB, monentarily releasing relay 4–VOB. In addition, the removal of negative battery from lead 616 by the momentary release of relay 4–VOA, opens the operating paths of the route relays 6–R01 through 6–R300 whereby the operated ones of the route repeat relays release.

The momentary release of relay 4–VOB removes negative battery from lead 715 whereby negative voltage is removed from the emitter of transistor Q702 in check flip-flop 710 and the corresponding emitters in flip-flops 711 through 713, resetting the operating one of the check flip-flops which in this case is flip-flop 712.

In addition, the momentary release of relay 4–VOB removes negative battery which is applied to lead 610 by way of resistor R612 whereby negative potential is removed from the emitter of transistor Q603 and from the base of transistor Q604 of flip-flop 609 and the corresponding emitters and bases of the other route flip-flops, whereby the operating ones of the flip-flops are reset.

The momentary release of relay 4–VOB also applies negative battery to leads 411 and 420.

The subsequent re-operation of relay 4–VOA re-operates relay 4–VOB. Relay 4–VOB operated, removes negative battery from lead 411 and the potential on lead 411 rises to ground by way of resistor R421. This positive-going transition on lead 411 is applied by way of capacitor C415 and varistor CR415 to the base of transistor Q412 in the set-zero-reset circuit. Since, as previously described, transistor Q412 was rendered conducting by the operation and release of relay 4–MP, the application of the positive pulse to the base of transistor Q412 turns the transistor off whereby transistor Q410 is turned on. The collector of transistor Q410 is rendered positive, removing the negative potential applied to the base of transistor Q406 by way of lead 403 and varistor CR409. Since, as previously described, the bid by the second director has removed the negative potential on lead 402, the base of transistor Q406 is rendered positive and the transistor turns off whereby the matrix pulse circuit comprising transistors Q407 and Q408 turns on and starts to time and relay 4–MP is again momentarily operated. The registration of the address code stored by the second director in code gate 602 by the alphabet fan circuits now proceeds, as described below.

*Noncomparison intercept circuits*

In the event that an incorrect number of director route relays of the first director are operated, the count by the check and scan circuit of the grounded route leads and the resultant operated stage of the scan pulse counter will not correspond with the operated one of the check flip-flop circuits 710 through 713. Referring now to comparison gate 812, for example, if scan pulse counter stage 802 is operated at the termination of the count, and check flip-flop circuit 710 is not operated, transistors Q813 and Q808 are both conducting. If scan pulse counter stage 802 is not operated and check flip-flop circuit 710 is operated at the termination of the count, transistors Q813 and Q808 are both nonconducting.

Assuming transistors Q813 and Q808 are both conducting, the positive potential on their collector circuits are applied to varistors CR805 and CR806, respectively. This removes negative potential from the base of transistor Q809 and transistor Q809 is rendered nonconducting. The consequent lowered collector potential of transistor Q809 is applied to lead 816 by way of varistor CR808.

In the event that transistor Q813 and Q808 are not conducting, the negative-going potential on their collectors are applied to varistors CR802 and CR803. This removes positive potential from the junction of resistor R802 and varistor CR807 whereby negative potential is supplied to lead 816 by way of resistor R802 and varistor CR807. Thus, where a scan pulse counter and a corresponding flip-flop check circuit are not simultaneously in their operated or nonoperated state, a negative potential is applied to lead 816. This negative potential lowers the base voltage of transistor Q810, turning on the transistor. The positive-going collector potential of transistor Q810 is applied by way of lead 817 and varistor CR811 to the base of transistor Q811. Transistor Q811 is rendered nonconducting and its positive collector potential is removed. This positive potential is also removed from lead 818 by way of varistor CR812. Lead 818 is maintained positive, however, by normally conducting transistor Q715, FIG. 7, due to the positive potential on the collector of transistor Q715 applied by way of lead 819 and varistor CR813, FIG. 8, to lead 818.

Recalling now that the monostable multivibrator comprising transistors Q711 and Q712 are operated at the conclusion of the counting cycle by the check scan circuit of FIG. 7, transistor Q712 conducting applies its positive emitter potential to the base of transistor Q715. Transistor Q715 is rendered nonconducting during the timing of the monostable multivibrator removing the positive potential on its collector and thereby removing the positive potential on lead 818 by way of lead 819 and varistor CH813. With the positive potentials removed from lead 818, the base voltage of transistor Q812 is lowered, rendering the transistor conducting. The collector potential of transistor Q812 is driven in a positive direction raising the base voltage of transistor Q814.

Transistors Q814 and Q815 comprise a bistable multivibrator circuit. Transistor Q814 is turned on by the positive potential applied to its base and the rendering of transistor Q814 conducting drives its collector potential in a negative direction and the negative collector potential is applied to the base of transistor Q815, rendering transistor Q815 conducting. In addition, the collector current of transistor Q814 is applied to ground by way of the winding of bad check relay 8–BC operating the relay.

Recalling now that the release of the first director from the output leads of the translator is delays after the count of the lead by the check scan circuit, FIG. 7, relay 8–BC operated completes a path from ground by way of the make contacts of relay 8–BC, FIG. 7, lead RT000 and then by common lead RT to the similarly identified lead in the first director circuit, FIG. 1, and then to the winding of relay 1–RT000 operating the relay. The operation of relay 1–RT000 prepares apparatus, not shown, which connects incoming line circuit 102 to an intercept or monitoring position, not shown, whereby the message may be visually examined. In addition, relay 1–RT000 operated completes an obvious energizing path for lamp 120 whereby the interception of a message is visually indicated.

As previously described, at the conclusion of the scan route leads by the check scan circuit, FIG. 7, transistors Q711 and Q712 start to time out. After timing out, relay 4–VOA is momentarily released and relay 4–VOA momentarily releases relay 4–VOB. The momentary release of relay 4–VOB applies negative battery to lead 420, as previously described, and this negative potential is applied to the base of transistor Q814 by way of lead 420, capacitor C815 and varistor CR827. This negative potential turns off transistor Q814 which turns off transistor Q815 and releases relay 8–BC.

A situation may occur wherein a group code address has four or a multiple of four routes. In this event, the operations of scan pulse counter 802 and check flip-flop 710 would indicate a good comparison. In the event, however, that none of the director route relays is operated or none of the indications of the operations of the route relays is detected by the translator circuit, comparison gate 812 would not detect a bad check since scan pulse counter stage 802 is normally operated. To indicate the failure of detecting the operation of at least one route relay in the director circuit, the first count register of FIG. 8 is provided.

As previously described, the first stage 802 of the scan pulse counter is operated before the counting of the operated ones of the director route relays is initiated. In the event that at least one indication of an operated director route relay is received, the scan pulse counter is advanced, turning off transistor Q805. The turning off of transistor Q805 in scan pulse counter stage 802 applies its positive collector potential by way of lead 807, lead 821, capacitor C806 and varistor CR815 to the base of normally conducting transistor Q817.

Transistors Q817 and Q818 of the first count register circuit comprise a bistable flip-flop circuit. The application of the positive pulse to the base of transistor Q817 turns the transistor off and its negatively-going collector potential is applied to the base of transistor Q818, turning this transistor on. The positive-going collector potential of transistor Q818 is applied to the base of normally conducting transistor Q819, turning transistor Q819 off. Transistor Q819, nonconducting, indicates that the operation of at least one director route relay has been counted by the translator circuit.

In the event that the indication of the operation of at least one director route relay is not received, transistor Q805 of scan pulse counter stage 802 is maintained conducting, whereby transistor Q817 remains in its conducting state and transistor Q818 remains in its nonconducting state. The negative collector potential of transistor Q818 applied to the base of transistor Q819 maintains transistor Q819 conducting. The positive collector potential of transistor Q819 is applied by way of leads 822 and 823 and varistor CR816 to the base of transistor Q811, turning transistor Q811 off. As previously described, with transistor Q811 nonconducting, the positive potential applied to lead 818, via varistor CR812, is removed. At the termination of the count by the check scan circuit of FIG. 7, transistor Q715 turns off, as previously described, and removes the positive potential on lead 818 by way of lead 819 and varistor CR813 whereby transistor Q812 is rendered conducting and transistors Q814 and Q815 are in turn rendered conducting. This operates relay 8–BC in the same manner as previously described whereby the intercept route relay 1–RT000 in the first director circuit is operated.

Returning now to transistor Q819 conducting, its positive collector potential is applied by way of lead 822 to the junction of varistor CR818 and capacitor C807, thus applying a positive enabling potential to varistor CR818. As previously described, at the termination of the count by the check and scan circuit of FIG. 7, transistor Q713 is momentarily rendered conducting. When transistor Q713 subsequently turns off, the resultant positive potential transition of its emitter is applied by way of leads 719 and 825, capacitor C807 and enabled varistor CR818 to the emitter of transistor Q821. Transistors Q821 and Q822 comprise a bistable circuit and the application of the positive pulse to the emitter of transistor Q821 turns the transistor on. The resultant positive-going collector potential of transistor Q821 is applied to the base of transistor Q822, turning transistor Q822 on. The collector current of transistor Q822 is applied by way of the no-count relay 8–NC to ground, operating relay 8–NC. Relay 8–NC operated completes an obvious path for lamp 827 which provides an indication that no count has been received. The bistable circuit comprising transistors Q821 and Q822 can be reset and relay 8–NC released by the operation of key 826 which provides ground to the emitter of transistor Q822.

Since only 300 code gates are provided in this embodiment for the eight-character address code, an incorrect or nonvalid address code which does not designate an addressee may be received. In this event, none of the gate varistors corresponding to varistor CR601 would be enabled. Consequently, none of the director route relays operate and scan pulse counter is not advanced. Therefore, the no-count circuit comprising transistors Q817 and Q818 is operated, as previously described, and relays 8–BC and 8–NC are operated, in turn. Accordingly, the message containing the nonvalid address code is intercepted and the translator no-count lamp 827 is energized in the same manner as described above.

*Second director connects to output of translator*

Returning now to the second operation of relay 4–MP in response to the bid of the second director 205 and the release of the first director 107 from the translator output, relay 4–MP operated applies ground to lead 405 which extends to the windings of the BX relays in the gate circuits shown in FIG. 4. Since the bid of the second director operates the AX relay in gate 403, grounded lead 405 operates the BX relay in gate 403, grounding lead BX302. Accordingly, the DBX relay in director 205 is operated and the route leads RT000 through RT–300 are extended to the route relays in director 205 in the same manner as the route relays of director 107 are connected to the route leads.

Relay 4–MP operated also applies a positive pulse to the gate varistors in the code gates, FIG. 6, as previously described. Since the gate varistor in code gate 602 is enabled, the positive pulse is gated to lead 618 which extends through magnetic ring M05, lead 619 and check ring CK1 to ground, energizing rings M05 and CK1. As previously described, the energization of ring M05 operates relay 6–R05 which, in turn operates a route relay in director 205. The energization of ring CK1 applies a positive potential on lead CNT1, turning off the transistor in comparison gate 813 corresponding to transistor Q808.

In addition, the operation of relay 4–MP restores negative battery to lead 613 by way of resistor R614. This negative-going potential transition on lead 613 is applied by way of lead 828 and capacitor C809 to lead 829 and then by way of varistors CR821, CR822 and CR-823 in parallel to the base of transistor Q806 and stage 803 of the scan pulse counter and the corresponding transistors in stages 804 and 805. Transistor Q806, if it is operated, is thus turned off, turning off in turn transistor Q807. Similarly, the bistable transistor circuit in each of stages 804 and 805 is turned off if it is operated. With stages 803, 804 and 805 turned off, transistors Q804 and Q805 in stage 802 turns on, as previously described. The scan pulse counter is now reset to its initial condition.

When relay 4–MP operates, ground is applied to lead 614 removing the negative potential previously applied to lead 614 by way of resistor R610. This positive voltage transition of lead 614 is applied by way of capacitor C811, FIG. 8, and varistor CR825 to the base of transistor Q818. If transistor Q818 is conducting, the positive potential on the base of transistor Q818 turns the transistor off, turning on in turn transistor Q817. The first count register circuit is now reset to its initial condition.

The release of relay 4–MP now releases the second director from the translator input and starts the check of the operated director route relays, in the same manner as previously described.

As previously described, relay 4–VOA is normally operated, maintaining relay 4–VOB operated. Since it is undesirable to maintain these relays operated for long periods of time when there are no bids by the director circuit, means are provided to release the relays after a predetermined duration of time.

As previously described, when a bid is detected by the translator circuit, translator Q401 is rendered nonconducting. The negative collector potential of transistor Q401 is applied by way of lead 417 to the base of transistor Q421. Transistor Q421 turns on, applying its positive collector potential to the base of transistor Q422, turning transistor Q422 off. When the sequence scanning circuit resumes scanning, transistor Q401 is again conductive, the positive collector potential of transistor Q401 is applied to the base of transistor Q421 by way of lead 417, turning transistor Q421 off.

Assuming now that a director bid is not detected and the sequence scanner continues to scan, the positive potential applied to the base of transistor Q422 and stored on the upper plate of capacitor C416, as shown in FIG. 4, when transistor Q421 was conducting, now discharges through resistor R418 to negative battery. After a predetermined interval of time, the potential on the base of transistor Q422 is reduced sufficiently to initiate the conduction of the transistor. The resultant positive potential on the collector of transistor Q422 is applied to the base of transistor Q418, turning transistor Q418 off. With transistor Q418 rendered nonconducting, relays 4–VOA and 4–VOB are released as previously described.

When a bid by a director is detected by the translator circuit, transistor Q401 is rendered nonconducting, as previously described, and its negative collector potential is applied to the base of transistor Q241 by way of lead 417. Transistor Q241 becomes conductive, rapidly charging capacitor C416 by way of its collector. This positive transition is also applied to the base of transistor Q422 whereby transistor Q422 is turned off and transistor Q418 is turned on. Relay 4–VOA is operated, operating in turn relay 4–VOB.

Although a specific embodiment of the invention has been shown and described, it will be understood that various modifications may be made without departing from the spirit of this invention and within the scope of the appended claims.

What is claimed is:

1. In a telegraph switching system, a plurality of director circuits, a common translating circuit, first means for connecting for each operation of said first means a separate one of said directors to the input of said translating circuit, second means responsive to said operation of said first means for connecting the output of said translating circuit to said one director, third means operably responsive to said second means for disconnecting said input connection and reoperating said first means, and fourth means independent of said operation of said third means and said input disconnection for thereafter releasing said output connection in response to said second means whereby another one of said directors may be connected to the input of said translating circuit before the release of said output connection.

2. In a telegraph switching system, a plurality of director circuits, a common translating circuit, a scanning stage associated with each of said director circuits for connecting said associated director circuit to the input of said translating circuit, advancing means for enabling for each operation of said advancing means a separate one of said stages, other means responsive to said enabled stage for connecting said associated director circuit to the output of said translating circuit, further means responsive to said other means for disconnecting said input connection and reoperating said advancing means, and releasing means responsive to said other means and independent of said further means, said input disconnection and said reoperation of said advancing means for thereafter releasing said output connection whereby another one of said director circuits may be connected to the input of said translating circuit before the release of said output connection.

3. In a switching system, a plurality of code signal storage circuits, a plurality of switching circuits associated with each of said storage circuits, a common translating circuit for operating said switching circuits, scanning means for applying signals for each operation of said scanning means from a separate one of said storage circuits to the input of said translating circuit, translating means for connecting the output of said translating circuit to selected ones of said associated switching circuits in accordance with said applied signal, further means responsive to said translating means for reoperating said scanning means, and delay means responsive to said translating means and independent of said further means and said reoperation of said scanning means for thereafter releasing said output connection.

4. In a switching system, a plurality of directors, each of said directors including means for storing permutation code signals and also including a plurality of switching circuits, a common translating circuit for operating selected ones of said switching circuits in response to code signals applied thereto, an input circuit individual to each of said director circuits for applying the code signals stored in the storing means of said individual director to said translating circuit, scanning means for enabling a separate one of said input circuits for each operation thereof, of said scanning means, other means responsive to the enabling of said input circuit for connecting the output of said translating circuit to the switching circuits of said associated director, further means responsive to said other means for disconnecting said input connection and reoperating said scanning means, and means responsive to said other means and independent of said further means, said input disconnection and said reoperation of said scanning means for thereafter releasing said output connection.

5. In a telegraph switching system, a plurality of director circuits, a common translating circuit, first means for connecting for each operation of said first means a separate one of said directors to the input of said translating circuit, second means responsive to said operation of said first means for connecting the output of said translator to said director, a timing circuit responsive to said operation of said first means, means responsive to said timing circuit for disconnecting said input connection and reoperating said first means, and delay means responsive to said timing circuit and independent of said input disconnection and reoperation of said first means for releasing said output connection.

6. In a switching system, a plurality of permutation code signal storage circuits, a plurality of switching circuits associated with each of said storage circuits, a common translating circuit for operating said switching circuits, scanning means for applying signals for each operation of said scanning means from a separate one of said storage circuits to the input of said translating circuit, translating means for connecting the output of said translating circuit to selected ones of said associated switching circuits in accordance with said applied signals, a timing circuit operated after a timed interval in response to said translating means, means responsive to said timing circuit for reoperating said scanning means, a counting circuit responsive to said timing circuit for counting said operated switching circuits and means responsive to said counting circuit and independent of said reoperation of said scanning means for releasing said output connection.

7. In a switching system, a plurality of permutation code signal storage circuits, a plurality of switching circuits associated with each of said storage circuits, a common translating circuit for operating said switching circuits, scanning means for applying signals stored in a separate one of said storage circuits to the input of said translating circuit for each operation of said scanning means, translating means for connecting the output of said translating circuit to selected ones of said associated switching circuits in accordance with said applied signals, means responsive to said translating means for reoperating said scanning means whereby another one of said storage circuits is separately connected to the input of said translator circuit, counting means responsive to said translating means for counting the selectively operated ones of said associated switching circuits, means responsive to said counting means for connecting the output of said translating circuit to a predetermined one of said associated switching circuits and delay means responsive to said counting circuit for releasing all of said output connections.

8. In a switching system, a plurality of permutation code signal storage circuits, a plurality of switching circuits associated with each of said storage circuits, a common translating circuit for operating said switching circuits, scanning means for applying signals for each operation of said scanning means from a separate one of said storage circuits to the input of said translating circuit, translating means for connecting the output of said translating circuit to selected ones of said associated switching circuits in accordance with said applied signals, timing means operated after a timed interval in response to said translating means, means responsive to said timing means for reoperating said scanning means whereby another one of said storage circuits is separately connected to the input of said translator circuit, counting means responsive to said timing means for counting the selectively operated ones of said associated switching circuits, means responsive to said counting means for connecting the output of said translating circuit to a predetermined one of said associated switching circuits and delay means responsive to said counting means for releasing all of said output connections.

9. In a switching system, a permutation code signal storage circuit, a plurality of switching circuits associated with said storage circuit, a translating circuit for operating said switching circuits, means for applying signals from said storage circuit to the input of said translating circuit, translating means for connecting the output of said translating circuit to selected ones of said switching circuits in accordance with said applied signals, counting means for counting the selectively operated ones of said switching circuits, and means responsive to said counting means for connecting the output of said translating circuit to a predetermined one of said switching circuits.

10. In a switching system a permutation code storage circuit, a plurality of switching circuits, a translating circuit, means for transferring stored code signals from said storage circuit to said translating circuit, a counting circuit, a translator circuit output lead individual to each of said switching circuits for operating said switching circuit, selective means responsive to the transfer of stored code signals to said translating circuit for extending selected ones of said leads to said individual switching circuits, a plurality of check circuits individually selectable by said selective means, means including said lead for advancing said counting circuit in response to the operation of said switching circuit, and a comparison circuit jointly responsive to said check circuits and said counting circuit for comparing the advance of said counting circuit and the selected check circuits.

11. In a switching system a permutation code storage circuit, a plurality of switching circuits, a translating circuit, means for transferring stored code signals from said storage circuit to said translating circuit, a counting circuit, a translator circuit output lead individual to each of said switching circuits for operating said switching circuit, selective means responsive to the transfer of stored code signals to said translating circuit for extending selected ones of said leads to said individual switching circuits, a plurality of check circuits individually selectable by said selective means, means including said lead for advancing said counting circuit in response to the operation of said switching circuit, a comparison circuit jointly responsive to said check circuits and said counting circuit for comparing the advance of said counting circuit and the selected check circuits, and means responsive to said comparison circuit for extending a predetermined one of said leads to said switching circuit individual thereto.

12. In a switching system a permutation code storage circuit, a plurality of relays, a translating circuit, means for transferring stored code signals from said storage circuit to said translating circuit, a translator circuit output lead individual to each of said relays for operating said relay, selective means responsive to the transfer of stored code signals to said translating circuit for extending selected ones of said leads to said individual relays, a gate circuit connected to each of said leads, means responsive to the operation of said relay for locking said relay and enabling said gate circuit by way of said lead, and a counting circuit for counting each of said enabled gate circuits.

13. In a switching system, a relay, a first and second energy source for operating said relay, a check circuit enabled solely in response to said second source, a path interconnecting said first source and said check circuit, means for extending said path to said relay and means responsive to the operation of said relay for applying said second source to said path whereby said relay is maintained operated and said check circuit is enabled.

14. In a switching system, a source of permutation code signals, a relay, a first and second energy source for operating said relay, a check circuit enabled solely in response to said second source, a path interconnecting said first source and said check circuit, a translator responsive to said code signals for extending said path to said relay and means responsive to the operation of said relay for applying said second source to said path whereby said relay is maintained operated and said check circuit is enabled.

15. In a switching system, a source of code signals, a switching circuit, a check circuit, a translating circuit for operating said switching circuit, a lead connected from the output of said translating circuit to said check circuit, means for transferring signals from said source to said translating circuit, means responsive to said transfer of signals for extending said lead to said switching circuit and means responsive to the operation of said switching circuit for enabling said check circuit by way of said lead.

16. In a telegraph switching system, a plurality of director circuits, a common translating circuit, first means for connecting for each operation of said first means a separate one of said directors to the input of said translating circuit, a normally enabled circuit, means jointly responsive to said normally enabled circuit and said operation of said first means for connecting said one director to the output of said translating circuit, means responsive to said jointly responsive means for disabling said normally enabled circuit and reoperating said first means to connect another one of said directors to the input of said translating circuit, and means responsive to said jointly responsive means for thereafter disconnecting the connection of the output of said translating circuit to said one director and enabling said normally enabled circuit.

17. In a telegraph switching system, a plurality of director circuits, a common translating circuit, first means for connecting for each operation of said first means a separate one of said directors to the input of said translating circuit, a normally enabled circuit, means jointly responsive to said normally enabled circuit and said operation of said first means for connecting said one director to the output of said translating circuit, means responsive to said jointly responsive means for disabling said normally enabled circuit and reoperating said first means to connect another one of said directors to the input of said translating circuit, delay means responsive to said jointly responsive means after a predetermined delay for disconnecting the connection of the output of said translating circuit to said one director and means responsive to said delay means for enabling said normally enabled circuit.

References Cited in the file of this patent

UNITED STATES PATENTS

| | | |
|---|---|---|
| 2,712,101 | Salati | June 28, 1955 |
| 2,716,206 | Salati | Aug. 23, 1955 |
| 2,766,318 | Bacon | Oct. 9, 1956 |
| 2,805,283 | Stiles | Sept. 3, 1957 |